United States Patent
Logunov

(10) Patent No.: US 9,851,500 B2
(45) Date of Patent: Dec. 26, 2017

(54) LIGHT-DIFFUSING OPTICAL ELEMENTS HAVING CLADDING WITH SCATTERING CENTERS

(71) Applicant: Corning Incorporated, Corning, NY (US)

(72) Inventor: Stephan Lvovich Logunov, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/995,570

(22) Filed: Jan. 14, 2016

(65) Prior Publication Data

US 2016/0231504 A1    Aug. 11, 2016

Related U.S. Application Data

(60) Provisional application No. 62/112,852, filed on Feb. 6, 2015.

(51) Int. Cl.
*F21V 7/04* (2006.01)
*G01S 1/00* (2006.01)
(Continued)

(52) U.S. Cl.
CPC ............ *G02B 6/02342* (2013.01); *B60R 1/00* (2013.01); *B60R 11/04* (2013.01); *C03B 37/025* (2013.01);
(Continued)

(58) Field of Classification Search
CPC ............ G02B 6/02342; G02B 6/02395; G02B 6/0006; G02B 6/001; C03B 37/025;
(Continued)

(56) References Cited

U.S. PATENT DOCUMENTS 6,424,772 B1 * 7/2002 Blazer ................ G02B 6/4408
  385/109
8,452,145 B2 * 5/2013 Li ...................... G02B 6/02342
  385/126

(Continued)

FOREIGN PATENT DOCUMENTS

| JP | 2011145520 | 7/2011 |
| WO | 2010011299 | 1/2010 |
| WO | 2014165048 | 10/2014 |

OTHER PUBLICATIONS

Endruweit et al: "Spectroscopic experiments regarding the efficiency of side emission optical fibres in the UV-A and visible blue spectrum", Optics and Lasers in Engineering, Elsevier, Amsterdam, NL, vol. 46, No. 2, Oct. 24, 2007 (Oct. 24, 2007), pp. 97-105.

(Continued)

*Primary Examiner* — Donald Raleigh
(74) *Attorney, Agent, or Firm* — Kevin L. Bray

(57) ABSTRACT

A light-diffusing optical element with efficient coupling to light sources with high numerical aperture. The light-diffusing optical element includes a higher index core surrounded by a lower index cladding. The cladding includes scattering centers that scatter evanescent light entering the cladding from the core. The scattered light exits the element to provide broad-area illumination along the element. Scattering centers include dopants, nanoparticles and/or internal voids. The core may also include scattering centers. The core is glass and the cladding may be glass or a polymer. The element features high numerical aperture and high scattering efficiency.

30 Claims, 5 Drawing Sheets

(51) Int. Cl.
*G09B 9/00* (2006.01)
*H01S 3/00* (2006.01)
*H01S 3/30* (2006.01)
*G02B 6/02* (2006.01)
*F21V 8/00* (2006.01)
*B60R 1/00* (2006.01)
*B60R 11/04* (2006.01)
*C03B 37/025* (2006.01)
*C03C 25/10* (2006.01)
*F21K 99/00* (2016.01)
*B60R 11/00* (2006.01)

(52) U.S. Cl.
CPC .............. *C03C 25/105* (2013.01); *F21K 9/52* (2013.01); *G02B 6/001* (2013.01); *G02B 6/0006* (2013.01); *G02B 6/02395* (2013.01); *B60R 2011/004* (2013.01); *B60R 2300/105* (2013.01); *B60R 2300/301* (2013.01); *B60R 2300/804* (2013.01); *B60R 2300/8026* (2013.01); *B60R 2300/8066* (2013.01); *C03C 2218/32* (2013.01)

(58) Field of Classification Search
CPC ..... F21K 9/52; C03C 25/105; C03C 2218/32; B60R 2300/105; B60R 2300/301; B60R 11/04; B60R 1/00; B60R 2300/8066; B60R 2011/004
See application file for complete search history.

(56) References Cited

U.S. PATENT DOCUMENTS

| | | | |
|---|---|---|---|
| 8,545,076 B2 | 10/2013 | Bickham | |
| 8,582,943 B2 | 11/2013 | Alkemper | |
| 8,591,087 B2 | 11/2013 | Bickham | |
| 8,871,116 B2 | 10/2014 | Duncan | |
| 2008/0181567 A1* | 7/2008 | Bookbinder | G02B 6/02366 385/127 |
| 2010/0220966 A1 | 9/2010 | Bennett | |
| 2011/0063872 A1 | 3/2011 | Irie | |
| 2011/0188261 A1* | 8/2011 | Deng | B29D 11/00663 362/551 |
| 2012/0275180 A1* | 11/2012 | Button | G02B 6/001 362/558 |
| 2013/0121655 A1* | 5/2013 | Adigrat | G02B 6/02333 385/123 |
| 2013/0156391 A1 | 6/2013 | Logunov | |
| 2013/0156392 A1* | 6/2013 | Logunov | G02B 6/0003 385/123 |
| 2013/0314940 A1* | 11/2013 | Russert | C03B 37/01222 362/556 |
| 2014/0092620 A1 | 4/2014 | Tissot | |

OTHER PUBLICATIONS

International Search Report, issued in connection with corresponding PCT application No. PCT/US2016/016487, dated May 30, 2016.

* cited by examiner

LIGHT-DIFFUSING OPTICAL ELEMENTS HAVING CLADDING WITH SCATTERING CENTERS

This application claims the benefit of priority under 35 U.S.C. §119 of U.S. Provisional Application Ser. No. 62/112,852 filed on Feb. 6, 2015 the content of which is relied upon and incorporated herein by reference in its entirety.

FIELD

The present disclosure relates to optical elements for diffusing light to provide broad area illumination. More particularly, the present disclosure relates to optical elements having high scattering efficiency to achieve efficient diffusion of light. The optical elements may also have high numerical aperture to permit efficient coupling to LED and laser diode illumination sources.

TECHNICAL BACKGROUND

Many optical systems utilize optical fibers to transmit light from a remote light source to a target destination. In a typical system, the light source is coupled to the fiber and light supplied by the source is guided by the fiber to the target destination. Optical fibers have been widely used in telecommunications to deliver information encoded in the form of an optical signal. A telecommunication link includes a transmitter that converts an electrical signal to an optical signal. The optical signal is launched into the fiber and transmitted to a receiver that reconverts the optical signal back to an electrical signal for further processing at the destination end of the link. Optical fibers have also been used as point illumination sources. In these applications, light from a source is coupled to the receiving end of the fiber and emerges from the destination end of the fiber as an illuminating beam.

There has recently been interest in extending the use of optical fibers to applications in broad-area illumination. In these systems, the objective is to achieve controlled release of light along at least portions of the length of the fiber. Instead of using the fiber to confine light and transmit it with minimal losses from a source to provide an optical signal or point illumination to a target positioned in the direction of the fiber axis, the objective is to use the lateral surface of the fiber as a broad-area source of illumination that operates in the radial direction of the fiber.

Light-diffusing fibers are a class of fibers that can be used as a broad-area illumination source. Light-diffusing fibers are designed to scatter light propagating in the direction of the fiber axis in radial directions out of the fiber. Radial scattering is typically accomplished by incorporating nanostructural voids in the core region of the fiber. The voids are low-index regions, typically filled with a gas, and have dimensions on the order of the wavelength of the light propagating through the fiber. The refractive index contrast between the voids and surrounding dense glass matrix effects scattering of the light. The scattering efficiency, and hence intensity of scattered light, can be controlled by controlling the dimensions, spatial arrangement and number density of voids. In addition to broad-area illumination, light-diffusing fibers can be employed in displays and as light sources in photochemical applications. Further information about light-diffusing fibers and representative applications can be found in U.S. Pat. Nos. 7,450,806 and 8,591,087, the disclosures of which are hereby incorporated by reference herein With the increasing trend away from conventional incandescent light sources, LEDs and laser diodes are becoming increasingly important light sources for optical fibers. Efficient coupling of LEDs and laser diodes to optical fibers presents challenges because of mismatches in cross-sectional area and numerical aperture (NA). The cross-sectional areas and numerical apertures of LEDs and laser diodes are much greater than the cross-sectional areas and numerical apertures of typical optical fibers.

One strategy for improving coupling efficiency is to increase the diameter of the optical fiber. The drawback to this approach, however, is that in order to maintain the flexibility of the fiber, it is desirable to maintain the diameter of the glass portion (core+cladding) at or below ~125 μm. Since much higher diameters are needed for efficient coupling to LEDs and laser diodes, this approach has limited effectiveness in applications where fiber flexibility is desired.

A second strategy for improving coupling efficiency is to increase the numerical aperture of the fiber. This strategy, however, is difficult to implement for conventional light diffusing optical fibers because the voids used in the core region to provide the scattering efficiency required for light diffusing fibers are low index regions and lead to a decrease in the average refractive index of the core. Since high numerical aperture is favored by increasing the refractive index of the core, the need to increase scattering efficiency in light diffusing optical fibers by including low index voids in the core region conflicts with the goal of increasing the numerical aperture of light diffusing fibers and makes it more difficult to achieve efficient coupling between LEDs and laser diodes and light diffusing optical fibers.

There is a need for light diffusing optical elements that couple efficiently to LEDs and laser diodes while maintaining the flexibility needed for deployment in tight space, bent configurations and areas where it is impossible to deploy conventional light sources.

SUMMARY

This disclosure provides a light-diffusing element for broad-area illumination that couples efficiently to LED and laser diode light sources. The light-diffusing element includes a core and a cladding. The core is configured from glass. The cladding is configured from glass or a polymer. The cladding includes scattering centers. The core may also include scattering centers. Scattering centers include dopants, nanoparticles, and internal voids. Light supplied from the light source enters the core and is guided through the light diffusing element.

The scattering centers may be nanostructural or microstructural regions that act to redirect light propagating in the direction of the central axis of the element in a radial, transverse or off-axis direction. The scattered light may exit the lateral surface of the element to provide broad-area illumination. Evanescent light entering the cladding from the core is scattered by scattering centers in the cladding to provide an illumination effect.

The scattering centers may be distributed throughout the cross-sectional direction of the element or localized to particular regions thereof. The scattering centers may be distributed throughout the cross-sectional area of the core or localized to particular regions of the core. The scattering centers may be distributed throughout the cross-sectional area of the cladding or localized to particular regions of the cladding. The scattering centers may be in the core, in the cladding, or in both core and cladding.

The scattering centers may be configured to scatter one or more wavelengths of light in the range from 25 nm to 20 µm.

The light-diffusing element may couple directly to a light source or couple to a light source through an intervening element. The light source may be a lamp, a laser, a laser diode, or an LED. The intervening element may be an optic, a clear glass rod, or a light-transmissive polymer.

The present description extends to:
A light-diffusing element comprising:
a glass core, said glass core having a diameter greater than 65 µm; and
a cladding surrounding said glass core, said cladding having a lower refractive index than said glass core, said cladding including first scattering centers, said first scattering centers having a cross-section with a dimension of at least 25 nm;
wherein said element exhibits light scattering losses of at least 0.1 dB/m.

The present description extends to:
An illumination system comprising:
a light source optically coupled to a light-diffusing element, said light-diffusing element comprising:
a glass core, said glass core having a diameter greater than 65 µm; and
a cladding surrounding said glass core, said cladding having a lower refractive index than said glass core, said cladding including first scattering centers, said first scattering centers having a cross-section with a dimension of at least 25 nm;
wherein said element exhibits light scattering losses of at least 0.1 dB/m The present description extends to:
A method for forming a light-diffusing element comprising:
forming a core, said core comprising glass;
forming a cladding on said core, said cladding including first scattering centers, said first scattering centers having a cross-section with a dimension of at least 25 nm.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
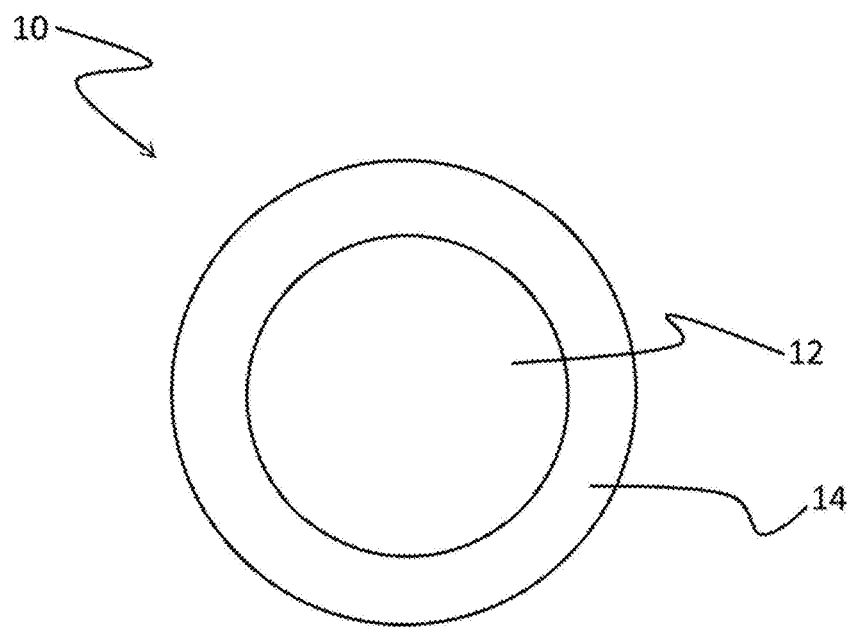
FIG. 1 is a schematic depiction of a cross-section of a light-diffusing element.

The present disclosure provides a light-diffusing element for broad-area illumination that couples efficiently to a variety of light sources, including LEDs and laser diodes. The light-diffusing element includes a core and a cladding. The core is configured from glass. The cladding is configured from glass or a polymer. The cladding includes scattering centers. The core may also include scattering centers. Scattering centers include dopants, nanoparticles, and voids. Light supplied from the light source enters the core and is guided through the light diffusing element. The direction of propagation of the guided light in the light-diffusing element may be referred to herein as the longitudinal or axial direction. The scattering centers effect scattering of light propagating in the light-diffusing element. As used herein, scattering refers to a redirection of the propagating light in a direction other than the longitudinal direction. The direction of scattered light may be referred to as an off-axis direction, a lateral direction, or a transverse direction. At least a portion of the scattered light passes the lateral surface of the light-diffusing element and exits the light-diffusing element to provide an illumination effect. The illumination effect may be broad-array illumination provided, for example, by illumination along all or a portion of the length of the element.

The light-diffusing element includes a core and a cladding surrounding the core. The core may also be referred to herein as the core region. The cladding may also be referred to herein as the clad, clad region, or cladding region. The core has a higher refractive index than the cladding. The light diffusing element has a length with a length dimension and a cross-section with a cross-sectional dimension. The length dimension is the dimension in the axial direction of the element and the cross-sectional dimension is a direction transverse to the direction of light propagation. In the instance in which the light-diffusing element has a rod configuration, for example, the length dimension of the light-diffusing element is the axial dimension, the cross-section may be circular, and the cross-sectional dimension may be the diameter. It is to be understood, however, that the cross-section of the light-diffusing element may be arbitrarily shaped and may include round or flat sides. Shapes of the cross-section may include circle, oval, square, rectangle, and polygon as well as shapes that include a combination of round and flat sides. As used herein, cross-sectional dimension refers to the longest straight-line distance that connects two points of the outline (e.g. circumference, perimeter) of the cross-section. By way of example: for circular cross-sections, the cross-sectional dimension is the diameter; for elliptical cross-sections, the cross-sectional dimension is the length of the major axis; and for square or rectangular cross-sections, the cross-sectional dimension is the distance between opposite corners. It is further understood that the shape and/or dimensions of the cross-section may be constant or variable along the length dimension of the light-diffusing element. A light-diffusing element having a circular cross-section, for example, may be tapered, where the diameter of the circular cross-section varies along the length of the light-diffusing element.

FIG. 1 depicts the cross-section of a light-diffusing element having a circular cross section. Light-diffusing element 10 includes core 12 and cladding 14. Light-diffusing element 10 may optionally include a protective coating (not shown) surrounding cladding 14. The cross-sectional dimension of the core may be at least 65 µm, or at least 80 µm, or at least 100 um, or at least 150 µm, or at least 200 µm, or at least 250 µm, or at least 300 µm, or between 65 µm and 500 µm, or between 100 µm and 400 µm, or between 200 µm and 350 µm. The thickness of cladding 14 may be at least 10 µm, or at least 15 µm, at least 20 µm, at least 25 µm, or between 10 µm and 80 µm, or between 10 µm and 40 µm, or between 15 µm and 35 µm, or between 20 µm and 30 µm. When present, an optional protective coating surrounding cladding 14 may have a thickness of at least 20 µm, or at least 40 at least 60 µm, at least 80 or between 20 µm and 120 µm, or between 30 µm and 100 µm, or between 40 µm and 80 µm.

In one embodiment, the combined cross-sectional dimension of the core and cladding of the light-diffusing element are significantly greater than the typical cross-sectional dimension of ~125 µm for the combined core and cladding regions of a conventional transmission optical fiber. The light capture efficiency of a waveguide is proportional to its etendue, which is defined as $G=S(NA)^2$, where S is the cross-sectional area and NA is the numerical aperture of the waveguide. A larger cross-sectional dimension of the light-diffusing element leads to an increase in etendue relative to a conventional transmission optical fiber and this increased numerical aperture improves the efficiency of coupling to LED and laser diode light sources. A typical LED source, for example, has a cross-sectional area of 1 mm$^2$ or higher and a numerical aperture (NA) of ~0.9, while the typical transmission optical fiber has a cross-sectional area of ~0.2 mm$^2$ and a numerical aperture of ~0.5 or less.

The length of light-diffusing element 10 may be at least 1 cm, or at least 5 cm, or at least 20 cm, or at least 50 cm, or at least 100 cm, or between 1 cm and 1000 cm, or between 1 cm and 100 cm, or between 1 cm and 50 cm, or between 1 cm and 20 cm, or between 5 cm and 100 cm, or between 5 cm and 50 cm, or between 5 cm and 20 cm.

The core is glass, such as silica glass or modified silica glass. The cladding may be glass or a polymer. Cladding glasses include silica glass or modified silica glass. Cladding polymers include acrylate polymers.

In one embodiment, the cladding polymer is the cured product of a cladding composition that includes a curable crosslinker, a curable diluent, and a polymerization initiator. The cladding composition may include one or more curable crosslinkers, one or more curable diluents, and/or one or more polymerization initiators. In one embodiment, the curable crosslinker is essentially free of urethane and urea functional groups.

As used herein, the term "curable" is intended to mean that the component, when exposed to a suitable source of curing energy, includes one or more curable functional groups capable of forming covalent bonds that participate in linking the component to itself or to other components to form the polymeric cladding material (i.e., the cured product). The curing process may be induced by radiation or by thermal energy. A radiation-curable component is a component that can be induced to undergo a curing reaction when exposed to radiation of a suitable wavelength at a suitable intensity for a sufficient period of time. The radiation curing reaction may occur in the presence of a photoinitiator. A radiation-curable component may also optionally be thermally curable. Similarly, a thermally-curable component is a component that can be induced to undergo a curing reaction when exposed to thermal energy of sufficient intensity for a sufficient period of time. A thermally curable component may also optionally be radiation curable.

A curable component may include one or more curable functional groups. A curable component with only one curable functional group may be referred to herein as a monofunctional curable component. A curable component having two or more curable functional groups may be referred to herein as a multifunctional curable component or a polyfunctional curable component. Multifunctional curable components include two or more functional groups capable of forming covalent bonds during the curing process and can introduce crosslinks into the polymeric network formed during the curing process. Multifunctional curable components may also be referred to herein as "crosslinkers" or "curable crosslinkers". Examples of functional groups that participate in covalent bond formation during the curing process are identified hereinafter.

In the description of the cladding composition that follows, various components of cladding compositions used to form cladding polymers will be discussed and the amounts of particular components in the cladding composition will be specified in terms of weight percent (wt %) or parts per hundred (pph). The components of the cladding composition include base components and additives. The concentration of base components will be expressed in terms of wt % and the concentration of additives will be expressed in terms of pph.

As used herein, the weight percent of a particular base component refers to the amount of the component present in the cladding composition on a basis that excludes additives. The additive-free cladding composition includes only base components and may be referred to herein as a base composition or base cladding composition. Any crosslinker component(s), diluent component(s), and polymerization initiator(s) present in a cladding composition are regarded individually as base components and collectively as a base composition. The base composition minimally includes a radiation-curable component and a polymerization initiator. The radiation-curable component may be a radiation-curable crosslinker or a radiation-curable diluent. The base composition may, however, include one or more radiation-curable crosslinker components, one or more radiation-curable diluent components, one or more non-radiation-curable components, and one or more polymerization initiators. The collective amount of base components in a cladding composition is regarded herein as equaling 100 weight percent.

Additives are optional and may include one or more of an adhesion promoter, an antioxidant, a catalyst, a carrier or surfactant, a tackifier, a stabilizer, and an optical brightener. Representative additives are described in more detail hereinbelow. The amount of additives introduced into the cladding composition is expressed herein in parts per hundred (pph) relative to the base composition. For example, if 1 g of a particular additive is added to 100 g of base composition, the concentration of additive will be expressed herein as 1 pph.

In one embodiment, the curable crosslinker is a radiation curable component of the cladding composition, and as such it includes one or more functional groups capable of participating in the covalent bonding or crosslinking of the crosslinker into the polymeric cladding material. In one embodiment, the curable crosslinker includes two or more radiation-curable functional groups. Exemplary functional groups capable of participating in the crosslinking include α,β-unsaturated ester, amide, imide or vinyl ether groups.

In one embodiment, the curable crosslinker is essentially free of urethane or urea groups. The curable crosslinker may also be essentially free of thiourethane or thiourea groups. By "essentially free" it is preferable that less than 1 weight percent of the curable crosslinker component includes (thio)urethane or (thio)urea groups. In preferred embodiments, less than 0.5 weight percent of the total curable crosslinker component includes (thio)urethane or (thio)urea groups. In most preferred embodiments, the curable crosslinker component is entirely free of both (thio)urethane and (thio)urea groups.

When identifying certain groups, such as urethane and thiourethane groups, or urea and thiourea groups, or isocyanate or thioisocyanate groups, these groups may be generically identified herein as (thio)urethane, (thio)urea, or (thio)isocyanate or di(thio)isocyanate to indicate that the sulfur atom(s) may or may not be present in the group. Such groups may be referred to herein as (thio)groups and components containing (thio)groups may be referred to herein as (thio)components. The present embodiments extend to cladding compositions that include (thio)components with sulfur atom(s) or without sulfur atom(s) in the (thio)functional group as well as compositions that include some (thio)components with sulfur atom(s) and some (thio)components without sulfur atom(s).

In certain embodiments, the curable crosslinker component includes one or more polyols that contain two or more α,β-unsaturated ester, amide, imide, or vinyl ether groups, or combinations thereof. Exemplary classes of these polyol crosslinkers include, without limitation, polyol acrylates, polyol methacrylates, polyol maleates, polyol fumarates, polyol acrylamides, polyol maleimides or polyol vinyl ethers comprising more than one acrylate, methacrylate, maleate, fumarate, acrylamide, maleimide or vinyl ether group. The polyol moiety of the curable crosslinker can be a polyether polyol, a polyester polyol, a polycarbonate polyol, or a hydrocarbon polyol.

The curable crosslinker component preferably has a molecular weight of between about 150 g/mol and about 15000 g/mol, in some embodiments more preferably between about 200 g/mol and about 9000 g/mol, in some embodiments preferably between about 1000 g/mol and about 5000 g/mol, in other embodiments preferably between about 200 g/mol and about 1000 g/mol. The curable crosslinker may further have a molecular weight in the range from 100 g/mol to 3000 g/mol, or in the range from 150 g/mol to 2500 g/mol, or in the range from 200 g/mol to 2000 g/mol, or in the range from 500 g/mol to 1500 g/mol.

The curable crosslinker component is present in the cladding composition in an amount of about 1 to about 20 percent by weight, or in an amount of about 2 to about 15 percent by weight, or in an amount of about 3 to about 10 percent by weight.

The curable diluent is a generally lower molecular weight (i.e., about 120 to 600 g/mol) liquid monomer that is added to the formulation to control the viscosity to provide the fluidity needed to apply the coating composition with conventional liquid coating equipment. The curable diluent contains at least one functional group that allows the diluent, upon activation during curing, to link to the polymer formed during the curing process from the curable crosslinker and other curable components. Functional groups that may be present in the curable diluent include, without limitation, acrylate, methacrylate, maleate, fumarate, maleimide, vinyl ether, and acrylamide groups.

Monofunctional diluents will contain only a single reactive (curable) functional group, whereas polyfunctional diluents will contain two or more reactive (curable) functional groups. Whereas the former can link to the cladding polymer network during curing, the latter can form crosslinks within the cladding polymer network.

When it is desirable to utilize moisture-resistant components, the diluent component will be selected on the basis of its compatibility with the selected moisture-resistant crosslinker(s) or component(s). Not all such liquid monomers may be successfully blended and copolymerized with the moisture-resistant crosslinker(s) or component(s) because such crosslinker(s) or component(s) are highly non-polar. For satisfactory cladding composition compatibility and moisture resistance, it is desirable to use a liquid acrylate monomer component comprising a predominantly saturated aliphatic mono- or di-acrylate monomer or alkoxy acrylate monomers.

Suitable polyfunctional ethylenically unsaturated monomer diluents include, without limitation, methylolpropane polyacrylates with and without alkoxylation such as ethoxylated trimethylolpropane triacrylate with the degree of ethoxylation being 3 or greater, preferably ranging from 3 to about 30 (e.g. Photomer 4149 available from IGM Resins, and SR499 available from Sartomer Company, Inc.), propoxylated trimethylolpropane triacrylate with the degree of propoxylation being 3 or greater, preferably ranging from 3 to 30 (e.g. Photomer 4072 available from IGM Resins; and SR492 and SR501 available from Sartomer Company, Inc.), and ditrimethylolpropane tetraacrylate (e.g. Photomer 4355 available from IGM Resins); alkoxylated glyceryl triacrylates such as propoxylated glyceryl triacrylate with the degree of propoxylation being 3 or greater (e.g. Photomer 4096 available from IGM Resins; and SR9020 available from Sartomer Company, Inc.); erythritol polyacrylates with and without alkoxylation, such as pentaerythritol tetraacrylate (e.g. SR295 available from Sartomer Company, Inc.), ethoxylated pentaerythritol tetraacrylate (e.g. SR494 available from Sartomer Company, Inc.), and dipentaerythritol pentaacrylate (e.g. Photomer 4399 available from IGM Resins; and SR399 available from Sartomer Company, Inc.); isocyanurate polyacrylates formed by reacting an appropriate functional isocyanurate with an acrylic acid or acryloyl chloride, such as tris-(2-hydroxyethyl)isocyanurate triacrylate (e.g. SR368 available from Sartomer Company, Inc.) and tris-(2-hydroxyethyl)isocyanurate diacrylate; alcohol polyacrylates with and without alkoxylation such as tricyclodecane dimethanol diacrylate (e.g. CD406 available from Sartomer Company, Inc.), alkoxylated hexanediol diacrylate (e.g. CD564 available from Sartomer Company, Inc.), tripropylene glycol diacrylate (e.g. SR306 available from Sartomer Company, Inc.) and ethoxylated polyethylene glycol diacrylate with a degree of ethoxylation being 2 or greater, preferably ranging from about 2 to 30; epoxy acrylates formed by adding acrylate to bisphenol A diglycidylether and the like (e.g. Photomer 3016 available from IGM Resins); and single and multi-ring cyclic aromatic or non-aromatic polyacrylates such as dicyclopentadiene diacrylate.

It may also be desirable to use certain amounts of monofunctional ethylenically unsaturated monomer diluents, which can be introduced to influence the degree to which the cured product absorbs water, adheres to other cladding composition materials, or behaves under stress. Exemplary monofunctional ethylenically unsaturated monomer diluents include, without limitation, hydroxyalkyl acrylates such as 2-hydroxyethyl-acrylate, 2-hydroxypropyl-acrylate, and 2-hydroxybutyl-acrylate; long- and short-chain alkyl acrylates such as methyl acrylate, ethyl acrylate, propyl acrylate, isopropyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate (e.g. SR440 available from Sartomer Company, Inc. and Ageflex FA8 available from CPS Chemical Co.), 2-ethylhexyl acrylate, nonyl acrylate, decyl acrylate, isodecyl acrylate (e.g. SR395 available from Sartomer Company, Inc.; and Ageflex FA10 available from CPS Chemical Co.), undecyl acrylate, dodecyl acrylate, tridecyl acrylate (e.g. SR489 available from Sartomer Company, Inc.), lauryl acrylate (e.g. SR335 available from Sartomer Company, Inc., Ageflex FA12 available from CPS Chemical Co. (Old Bridge, N.J.), and Photomer 4812 available from IGM Resins), octadecyl acrylate, and stearyl acrylate (e.g. SR257 available from Sartomer Company, Inc.); aminoalkyl acrylates such as dimethylaminoethyl acrylate, diethylaminoethyl acrylate, and 7-amino-3,7-dimethyloctyl acrylate; alkoxyalkyl acrylates such as butoxyethyl acrylate, phenoxyethyl acrylate (e.g. SR339 available from Sartomer Company, Inc., Ageflex PEA available from CPS Chemical Co., and Photomer 4035 available from IGM Resins), phenoxyglycidyl acrylate (e.g. CN131 available from Sartomer Company, Inc.), lauryloxyglycidyl acrylate (e.g. CN130 available from Sartomer Company, Inc.), and ethoxyethoxyethyl acrylate (e.g. SR256 available from Sartomer Company, Inc.); single and multi-ring cyclic aromatic or non-aromatic acrylates such as cyclohexyl acrylate, benzyl acrylate, dicyclopentadiene acrylate, dicyclopentanyl acrylate, tricyclodecanyl acrylate, bornyl acrylate, isobornyl acrylate (e.g. SR423 and SR506 available from Sartomer Company, Inc., and Ageflex IBOA available from CPS Chemical Co.), tetrahydrofurfuryl acrylate (e.g. SR285 available from Sartomer Company, Inc.), caprolactone acrylate (e.g. SR495 available from Sartomer Company, Inc.; and Tone M100 available from Union Carbide Company, Danbury, Conn.), and acryloylmorpholine; alcohol-based acrylates such as polyethylene glycol monoacrylate, polypropylene glycol monoacrylate, methoxyethylene glycol acrylate, methoxypolypropylene glycol acrylate, methoxypolyethylene glycol acrylate, ethoxydiethylene glycol acrylate, and various alkoxylated alkylphenol acrylates such as ethoxylated (4) nonylphenol acrylate (e.g. Photomer 4003 available from IGM Resins; and SR504 available from Sartomer Company, Inc.) and propoxylatednonylphenol acrylate (e.g. Photomer 4960 available from IGM Resins); acrylamides such as diacetone acrylamide, isobutoxymethyl acrylamide, N,N'-dimethyl-aminopropyl acrylamide, N,N-dimethyl acrylamide, N,N-diethyl acrylamide, and t-octyl acrylamide; vinylic compounds such as N-vinylpyrrolidone and N-vinylcaprolactam (both available from International Specialty Products, Wayne, N.J.); and acid esters such as maleic acid ester and fumaric acid ester.

The curable monomer diluent can include a single diluent component, or combinations of two or more monomer diluent components. The curable monomer diluent(s) is (are collectively) typically present in the cladding composition in amounts of about 10 to about 60 percent by weight, more preferably between about 20 to about 50 percent by weight, and most preferably between about 25 to about 45 percent by weight.

The cladding composition includes a polymerization initiator. The polymerization initiator is a reagent that is suitable to cause polymerization (i.e., curing) of the cladding composition after its application to the core of the light-diffusing element. Polymerization initiators suitable for use in the cladding compositions include thermal initiators, chemical initiators, electron beam initiators, and photoinitiators. Photoinitiators are the preferred polymerization initiators. For most acrylate-based cladding polymer formulations, conventional photoinitiators, such as the known ketonic photoinitiators and/or phosphine oxide photoinitiators, are preferred. When used in the present cladding compositions, the photoinitiator is present in an amount sufficient to provide rapid ultraviolet curing. Generally, this includes between about 0.5 to about 10.0 percent by weight, more preferably between about 1.5 to about 7.5 percent by weight.

The photoinitiator, when used in a small but effective amount to promote radiation cure, should provide reasonable cure speed without causing premature gelation of the coating composition. A desirable cure speed is any speed sufficient to cause substantial curing of the coating materials.

Suitable photoinitiators include, without limitation, 1-hydroxycyclohexylphenyl ketone (e.g. Irgacure 184 available from BASF), (2,6-dimethoxybenzoyl)-2,4,4-trimethylpentyl phosphine oxide (e.g. commercial blends Irgacure 1800, 1850, and 1700 available from BASF), 2,2-dimethoxyl-2-phenyl acetophenone (e.g. Irgacure 651, available from BASF), bis(2,4,6-trimethyl benzoyl)phenyl-phosphine oxide (e.g. Irgacure 819, available from BASF), (2,4,6-trimethylbenzoyl)diphenyl phosphine oxide (e.g. Lucerin TPO available from BASF, Munich, Germany), ethoxy(2,4,6-trimethylbenzoyl)phenyl phosphine oxide (e.g. Lucerin TPO-L from BASF), and combinations thereof.

The polymeric cladding compositions may also include one or more additives. Representative additives include an adhesion promoter, an antioxidant, a catalyst, a carrier or surfactant, a tackifier, a stabilizer, and an optical brightener. Some additives (e.g., catalysts, reactive surfactants, and optical brighteners) may operate to control the polymerization process and may thereby affect the physical properties (e.g., modulus, glass transition temperature) of the cured product formed from the cladding composition. Other additives may influence the integrity of the cured product of the cladding composition (e.g., protect against de-polymerization or oxidative degradation).

An adhesion promoter enhances the adhesion of the primary coating to the underlying glass fiber. Any suitable adhesion promoter can be employed. Examples of a suitable adhesion promoter include, without limitation, organofunctional silanes, titanates, zirconates, and mixtures thereof. One preferred class are the poly(alkoxy)silanes. Suitable alternative adhesion promoters include, without limitation, bis(trimethoxysilylethyl)benzene, 3-mercaptopropyltrimethoxysilane (3-MPTMS, available from United Chemical Technologies, Bristol, Pa.; also available from Gelest, Morrisville, Pa.), 3-acryloxypropyltrimethoxysilane (available from Gelest), and 3-methacryloxypropyltrimethoxysilane (available from Gelest), and bis(trimethoxysilylethyl) benzene (available from Gelest). Other suitable adhesion promoters are described in U.S. Pat. Nos. 4,921,880 and 5,188,864 to Lee et al., each of which is hereby incorporated by reference. The adhesion promoter, if present, is used in an amount between about 0.1 to about 10 pph, more preferably about 0.25 to about 3 pph.

Any suitable antioxidant can be employed. Preferred antioxidants include, without limitation, bis hindered phenolic sulfide or thiodiethylene bis(3,5-di-tert-butyl)-4-hydroxyhydrocinnamate (e.g. Irganox 1035, available from BASF), 2,6-di-t-butyl-4-methylphenol (BHT). The antioxidant, if present, is used in an amount between about 0.1 pph to about 3 pph, more preferably about 0.25 pph to about 2 pph.

Suitable carriers, more specifically carriers which function as reactive surfactants, include polyalkoxypolysiloxanes. Exemplary preferred carriers are available from Goldschmidt Chemical Co. (Hopewell, Va.) under the tradename TEGORAD 2200 and TEGORAD 2700 (acrylated siloxane). These reactive surfactants may be present in a preferred amount between about 0.01 pph to about 5 pph, more preferably about 0.25 pph to about 3 pph. Other classes of suitable carriers are polyols and non-reactive surfactants. Examples of suitable polyols and non-reactive surfactants include, without limitation, the polyol Acclaim 3201 (poly (ethylene oxide-co-propylene oxide)) available from Bayer (Newtown Square, Pa.), and the non-reactive surfactant Tegoglide 435 (polyalkoxy-polysiloxane) available from Goldschmidt Chemical Co. The polyol or non-reactive surfactants may be present in a preferred amount between about 0.01 pph to about 10 pph, more preferably about 0.05 pph to about 5 pph, most preferably about 0.1 pph to about 2.5 pph.

Suitable carriers may also be ambiphilic molecules. An ambiphilic molecule is a molecule that has both hydrophilic and hydrophobic segments. The hydrophobic segment may alternatively be described as a lipophilic (fat/oil loving) segment. A tackifier is an example of one such ambiphilic molecule. A tackifier is a molecule that can modify the time-sensitive rheological property of a polymer product. In general a tackifier additive will make a polymer product act stiffer at higher strain rates or shear rates and will make the polymer product softer at low strain rates or shear rates. A tackifier is an additive that is commonly used in the adhesives industry, and is known to enhance the ability of a coating to create a bond with an object that the coating is applied upon. One preferred tackifier is Uni-Tac® R-40 (hereinafter "R-40") available from International Paper Co., Purchase, N.Y. R-40 is a tall oil rosin, which contains a polyether segment, and is from the chemical family of abietic esters. A suitable alternative tackifier is the Escorez® series of hydrocarbon tackifiers available from Exxon. For additional information regarding Escorez® tackifiers, see U.S. Pat. No. 5,242,963 to Mao, which is hereby incorporated by reference in its entirety. The aforementioned carriers may also be used in combination. Preferably, the tackifier is present in the composition in an amount between about 0.01 pph to about 10 pph, more preferably in the amount between about 0.05 pph to about 5 pph.

Any suitable stabilizer can be employed. One preferred stabilizer is a tetrafunctional thiol, e.g., pentaerythritol tetrakis(3-mercaptopropionate) from Sigma-Aldrich (St. Louis, Mo.). The stabilizer, if present, is used in an amount between about 0.01 pph to about 1 pph, more preferably about 0.01 pph to about 0.2 pph.

Any suitable optical brightener can be employed. Exemplary optical brighteners include, without limitation, Uvitex OB, a 2,5-thiophenediylbis(5-tert-butyl-1,3-benzoxazole) (BASF); Blankophor KLA, available from Bayer; bisbenzoxazole compounds; phenylcoumarin compounds; and bis (styryl)biphenyl compounds. The optical brightener is desirably present in the composition at a concentration of about 0.003 pph to about 0.5 pph, more preferably about 0.005 pph to about 0.3 pph.

To increase the numerical aperture of the light-diffusing element and improve coupling efficiency to high numerical aperture light sources, it is desirable to maximize the refractive index contrast between the core and cladding. One strategy for increasing the numerical aperture of the light-diffusing element is to reduce the refractive index of the polymer cladding. The refractive index of the polymer cladding can be reduced by incorporating fluorinated or partially fluorinated analogs of the crosslinker(s) and/or monomer diluent(s) used in the cladding composition. Fluorine-substituted variants of the crosslinkers and monomer diluents described hereinabove can be prepared using methods known in the art.

Figure 2:
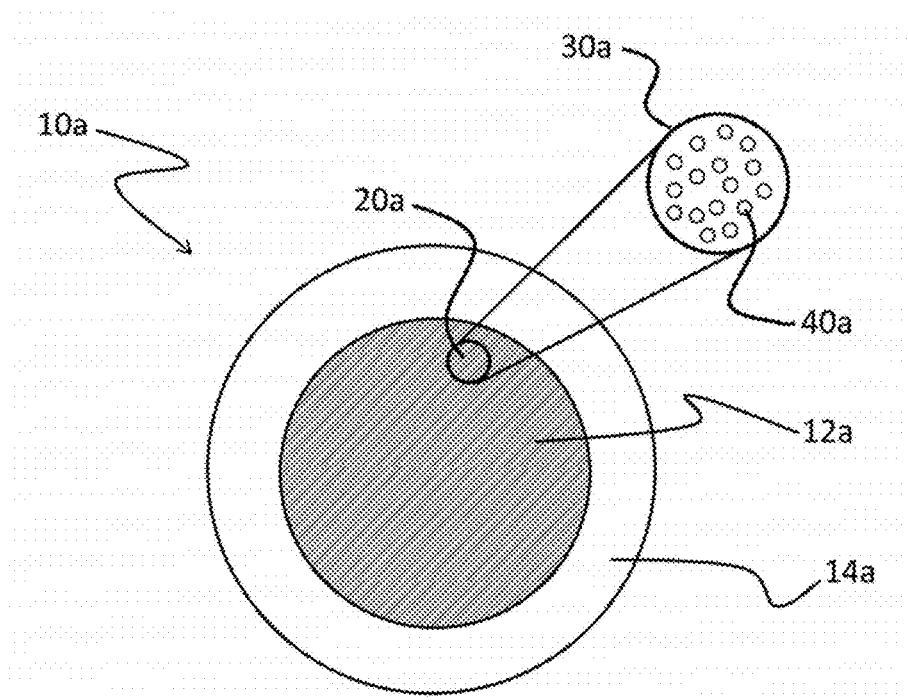
FIG. 2 is a schematic depiction of a cross-section of a light diffusing element having scattering centers in the core.
Figure 3:
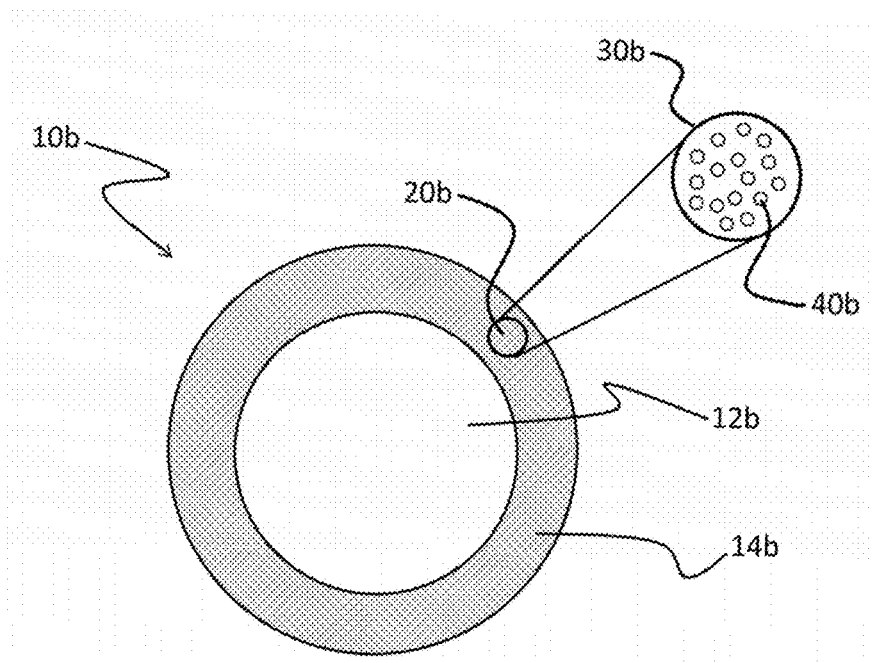
FIG. 3 is a schematic depiction of a cross-section of a light diffusing element having scattering centers in the cladding.
Figure 4:
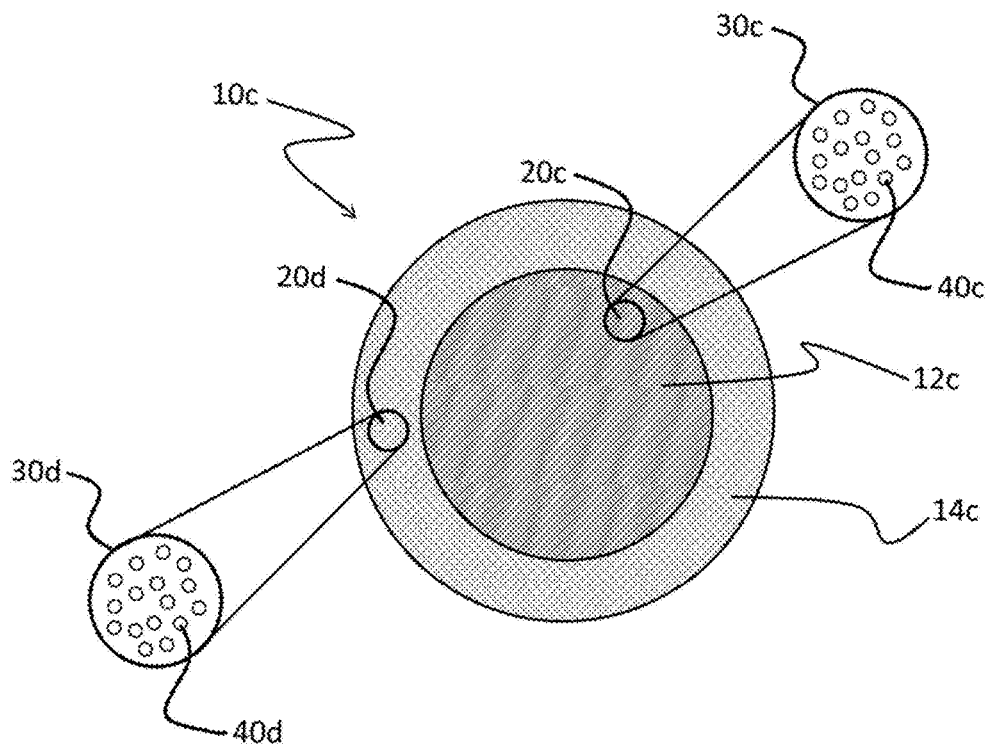
FIG. 4 is a schematic depiction of a cross-section of a light diffusing element having scattering centers in the core and cladding.

FIGS. 2-4 depict variations 10a-10c, respectively, of light diffusing element 10 of FIG. 1 that include scattering centers in the core and/or cladding. In one embodiment, the core includes scattering centers and the cladding lacks scattering centers. In another embodiment, the core lacks scattering centers and the cladding includes scattering centers. In still another embodiment, the core includes scattering centers and the cladding includes scattering centers. When indicating herein that a region (core or cladding) lacks scattering centers, it is intended to mean that no deliberate introduction of scattering centers into the region has occurred. It will be appreciated, however, that imperfections or fluctuations in composition, density etc. may induce scattering.

FIG. 2 depicts light-diffusing element 10a having core 12a and cladding 14a, where core 12a includes scattering centers and cladding 14a lacks scattering centers. Enlargement 30a of region 20a of core 12a shows scattering centers 40a. FIG. 3 depicts light-diffusing element 10b having core 12b and cladding 14b, where core 12b lacks scattering centers and cladding 14b includes scattering centers. Enlargement 30b of region 20b of core 12b shows scattering centers 40b. FIG. 4 depicts light-diffusing element 10c having core 12c and cladding 14c, where core 12c includes scattering centers and cladding 14c includes scattering centers. Enlargement 30c of region 20c of core 12c shows scattering centers 40c and enlargement 30d of region 20d of core 12d shows scattering centers 40d. For purposes of illustration, scattering centers 40a-40d are shown as having uniform cross-sectional size and shape. In practice, a distribution of sizes (cross-sectional and/or length dimensions) and shapes for the scattering centers will be present. The size and shape distribution as well as number of scattering centers may vary within a cross-section, in the core relative to the cladding, and/or along the length of the light-diffusing element.

Scattering centers for the core and cladding include dopants, nanoparticles, and internal voids. Preferred scattering centers for glass regions of the light-diffusing element are dopants and internal voids. Preferred scattering centers for polymer regions are nanoparticles and internal voids.

In one embodiment, the scattering centers are dopants. Dopants are elements that are incorporated into a base glass composition to modify the refractive index. Dopants include updopants and downdopants. An updopant is a dopant that raises the refractive index of the base glass composition and a downdopant is a dopant that lowers the refractive index of the base glass composition. In one embodiment, the base glass composition (of the core and/or cladding) is silica glass. Up-dopants for silica glass include Ge, Al, P, Ti, Cl, and Br. Downdopants for silica glass include F and B. The incorporation of dopants in a glass core or glass cladding enhances scattering through the Rayleigh scattering and/or small angle scattering mechanisms.

In another embodiment, the scattering centers are voids. Voids are internal gas-filled regions within the core or cladding. Gases that fill the internal void include $SO_2$, noble gases, $CO_2$, $N_2$, $O_2$, air, or mixtures thereof. The internal voids have a lower refractive index than the surrounding solid core or solid cladding material. When present, internal voids contribute to a reduction in the average refractive index of the core or cladding and provide centers that scatter light. The internal voids may be distributed throughout the cross-section of the core and/or cladding or localized within one or more discrete regions thereof. The internal voids may be configured in a random or non-periodic arrangement and may have a uniform or non-uniform distribution of size or number.

In glass, the internal voids may have a cross-section with a dimension of at least 50 nm, or at least 100 nm, or at least 500 nm, or between 50 nm and 20 μm, or between 100 nm and 10 μm or between 500 nm and 10 μm, or between 500 nm and 5 μm. In cladding polymer, the internal voids may have a cross-section with a dimension or at least 25 nm, or at least 100 nm, or at least 250 nm, or at least 500 nm, or at least 1000 nm, or between 25 nm and 40 μm, or between 100 nm and 40 μm, or between 250 nm and 40 μm, between 500 nm and 20 μm, or between 1000 nm and 10 μm. In glass, the internal voids may have a length in the range from a few microns to a several meters; for example between 1 μm and 50 μm, or between 10 μm and 30 μm, or between 100 μm and 20 μm, or between 1 μm and 1 μm, or between 1 μm and 100 cm, or between 1 μm and 10 cm, or between 10 μm and 10 μm or between 10 μm and 1 μm, or between 10 μm and 100 cm, or between 10 μm and 10 cm, or between 100 μm and 1 μm. In cladding polymer, the internal voids may have a length between 25 nm and 40 μm, or between 100 nm and 40 μm, or between 250 nm and 40 μm, or between 500 nm and 20 μm, or between 500 nm and 40 μm, or between 500 nm and 20 μm, or between 500 nm and 10 μm, or between 500 nm and 5 μm. The internal voids within the core or cladding may include a distribution of cross-sectional dimensions and lengths.

In the core, the internal voids may occupy a fill fraction of between 0.5% and 20% of the core, or between 1% and 15% of the core, or between 2% and 10% of the core. In the cladding (glass or polymer), the internal voids may occupy a fill fraction of between 0.5% and 30% of the cladding, or between 1% and 15% of the cladding, or between 2% and 10% of the cladding. As used herein, fill fraction refers to the fraction of the cross-sectional area occupied by the internal voids. In one embodiment, the fill fraction is constant along the length of the light-diffusing element. In another embodiment, the fill fraction varies along the length of the light-diffusing element. To a good approximation, the fill fraction corresponds to the volume fraction of internal voids. The volume fraction of voids within the core may be at least 0.5%, or at least 1.0%, or at least 2.0%, or at least 5.0%, or between 0.5% and 20%, or between 1% and 15%, or between 2% and 10%. The volume fraction of voids within the cladding (glass or polymer) may be at least 0.5%, or at least 1.0%, or at least 2.0%, or at least 5.0%, or between 0.5% and 30%, or between 1.0% and 15%, or between 2.0% and 10%, or between 2.0% and 30%, or between 3.0% and 20%.

The cross-sectional distribution of internal voids may vary at different positions in the core and/or cladding along the length of the light-diffusing element. As noted, the length and cross-sectional attributes (e.g. shape and size or density) of the internal voids may vary. The variations may also occur in the axial or length direction of the light-diffusing element. Since the length of the internal voids may not extend the full length of the light-diffusing element, particular internal voids may be present in some cross-sections and absent in other cross-sections.

In a further embodiment, the scattering centers are nanoparticles. Nanoparticles are particulate matter having dimensions in the nanoscale regime. The cross-sectional dimension of the nanoparticles may be at least 25 nm, or at least 50 nm, or at least 100 nm, or at least 150 nm, or at least 200 nm, or between 25 nm and 500 nm, or between 50 nm and 400 nm, or between 50 nm and 300 nm, or between 50 nm and 200 nm, or between 100 nm and 400 nm, or between 100 nm and 300 nm. In one embodiment, the nanoparticles are approximately spherical and the cross-sectional dimension is the diameter of the sphere. The concentration of nanoparticles may be between 1% and 30% by volume, or between 2% and 25% by volume, or between 5% and 20% by volume.

In one embodiment, the nanoparticles are oxide nanoparticles. Representative compositions for oxide nanoparticles include $TiO_2$, $ZrO_2$, other transition metal oxides, rare earth oxides, mixed metal oxides (e.g. garnets such as $Y_3Al_5O_{12}$), $SiO_2$, and $Al_2O_3$. Fluoride or chalcogenide nanoparticles may also be used. In one embodiment, the nanoparticles are luminescent (e.g. fluorescent or phosphorescent). Luminescent nanoparticles include oxides that include a light-emitting metal center. Light-emitting metal centers include $Cr^{3+}$, $Ce^{3+}$, $Nd^{3+}$, $Tb^{3+}$, $Eu^{3+}$, and $Pr^{3+}$. Light-emitting metal centers may be incorporated as dopants in otherwise non-luminescent inorganic host lattices (e.g. oxide lattices such as $Y_3Al_5O_{12}$ or $Al_2O_3$). Luminescent nanoparticles also include quantum dots or light-emitting semiconductor materials such as CdS, CdSe, ZnTe, ZnS, or other direct bandgap II-VI or III-V semiconductor materials. Use of light-emitting scattering centers permits control of the color of light emanating from the light-diffusing element. The light-emitting scattering centers in the cladding absorb at least a portion of the light scattered from the core and reemit the light at a different wavelength to modify the color of the light. Light-emitting nanoparticles that emit at multiple wavelengths may be incorporated to provide greater control over color to achieve any color, or combinations of colors, in the spectrum (including white light). Inclusion of light-emitting scattering centers avoids the need to apply a separate phosphor coating layer over the light-diffusing element.

In one embodiment, the light-diffusing element includes an undoped glass core and a glass cladding with internal voids. In another embodiment, the light-diffusing element includes a doped glass core and a glass cladding with internal voids. In still another embodiment, the light-diffusing element includes an undoped glass core and a polymer cladding with internal voids. In yet another embodiment, the light-diffusing element includes a doped glass core and a polymer cladding with internal voids. In a further embodiment, the light-diffusing element includes an undoped glass core and a polymer cladding with nanoparticles. In an additional embodiment, the light-diffusing element includes a doped glass core and a polymer cladding with nanoparticles.

In one embodiment, the light-diffusing element includes a glass core with internal voids and a glass cladding with internal voids. In another embodiment, the light-diffusing element includes a glass core with internal voids and a polymer cladding with internal voids. In still another embodiment, the light-diffusing element includes a glass core with internal voids and a polymer cladding with nanoparticles.

The core and/or cladding may include more than one type of scattering center. In one embodiment, the core is a glass that includes a dopant and internal voids. In another embodiment, the cladding is a glass that includes a dopant and internal voids. In still another embodiment, the cladding is a polymer that includes internal voids and nanoparticles.

The light-diffusing element may be configured to scatter light along all or some of its length by controlling the placement and concentration of the scattering centers in the core and/or cladding. Regions of the light-diffusing element that include scattering centers may efficiently scatter light to produce an illumination effect, while regions of the light-diffusing element that lack scattering centers may not. As described more fully below, processing conditions may be used to control whether scattering centers form in a particular region of the light-diffusing element and the spatial and dimensional characteristics of internal voids that do form. The light-diffusing element may include cross-sections or extended lengths of solid glass without scattering centers that scatter little or no light along with cross-sections or extended lengths that include scattering centers. Regions or cross-sections with and without scattering centers may be interspersed or alternating along the length of the light-diffusing element.

The brightness of the light-diffusing element as an illumination source depends on the intensity of scattered light that passes through the outer surface. The intensity of scattered light depends on the scattering loss of light propagating through the light-diffusing element. As used herein, scattering loss refers to light directed outside of the light-diffusing element by the combined scattering of the core and cladding. A higher scattering loss leads to a greater intensity of scattered light per unit length of the light-diffusing element and increases the brightness of the light-diffusing element. The scattering loss of the light-diffusing element may be at least 0.1 dB/m, or at least 0.5 dB/m, or at least 1 dB/m, or at least 2 dB/m, or at least 5 dB/m, or at least 10 dB/m.

In some applications, it may be desirable to achieve uniformity in illumination intensity along the length of the light-diffusing elements or selected regions thereof. The intensity of scattered light that passes through the outer surface of the element may have a maximum value. The variation in the intensity of the scattered light that passes through the outer surface of the element may vary by less than 50% of the maximum value along the length of the element or selected portions thereof at the illumination wavelength, or less than 30% of the maximum value along the length of the element or selected portions thereof at the illumination wavelength, or less than 20% of the maximum value along the length of the element or selected portions thereof at the illumination wavelength.

The scattering efficiency may vary along the length of the light-diffusing element. It may be desirable to control the degree of variation of scattering of the illumination wavelength along the length of the light-diffusing element or selected portions thereof to achieve a more uniform illumination effect. The scattering efficiency may be different near the source end of the element relative to near the delivery end of the element. The scattering efficiency may increase along the element with increasing distance from the source end of the element. Higher scattering efficiency at positions more distant from the source act to preserve illumination intensity by compensating for losses in the intensity of source light with increasing distance from the source. As light propagates away from the source in the light-diffusing element, it scatters and its intensity progressively decreases.

To maintain brightness, the light-diffusing element can be configured to provide an increasing scattering efficiency as the intensity of source light diminishes with increasing distance from the source. Scattering efficiency can be controlled, for example, by varying the concentration, size and/or composition of scattering centers along the length of the light-diffusing element.

The scattering efficiency along the length of the element may have a maximum value. The scattering efficiency at the illumination wavelength along the length of the light-diffusing element or selected portions thereof may vary by less than 50% of the maximum value, or less than 30% of the maximum value, or less than 20% of the maximum value. The stated variations in scattering efficiency, scattered light intensity, and/or the stated scattering losses may be simultaneously realized in the light-diffusing element.

Inclusion of scattering centers in the cladding obviates the need for a separate outer surface ink layer on the light-diffusing element. As is known in the art, ink layers are commonly applied to light-diffusing elements to control or modify the angular distribution of light scattered from the light-diffusing element. The ink layer may be utilized to enhance the distribution and/or the nature of the scattered light. The ink layer may make the angular distribution of light scattered from the light-diffusing element more uniform by compensating for directional bias (e.g. forward scattering vs. backward scattering) in the scattering of light from the core region to provide greater angular uniformity in the scattering of light. Angle independence in the distribution of light scattered from the light-diffusing element promotes a more uniform intensity distribution in the angular direction. The presence of scattering centers in the cladding inherently provides the benefits of a surface ink layer.

Glass portions of the light-diffusing element may be made by forming a soot-containing optical fiber preform via chemical vapor deposition (CVD), outer vapor deposition (OVD), vapor axial deposition (VAD), flame hydrolysis, flame oxidation, or other techniques known in the art. Dopants can be provided in the glass composition used to make the preform. The preform can include a core region and/or a cladding region, where doping may differ in each region.

To form internal voids, the soot preform may be consolidated in a gaseous atmosphere that surrounds the preform. Consolidation in the presence of the gaseous atmosphere causes a portion of the gaseous atmosphere to become trapped in the preform during consolidation, thereby resulting in the formation of internal voids in the consolidated preform. The voids may be non-periodically distributed in the consolidated preform and each void may correspond to a region of at least one trapped consolidated gas within the consolidated glass preform. The consolidated preform with voids is then drawn to make a light-diffusing element in accordance with the present disclosure. At least some of the voids formed in the preform during consolidation remain in the drawn element. A light-diffusing fiber or multiple light-diffusing fibers may be utilized in place of a fiber perform.

The conditions under which consolidation occurs may be manipulated to control the size, shape, length, fill fraction, and spatial distribution of voids. Directional control of void characteristics (e.g. along the axial vs. transverse directions) may also be achieved. The consolidation conditions may be effective to result in a significant amount of gases being trapped in the consolidated glass blank, thereby causing the formation of non-periodically distributed voids in the consolidated glass preform. The resultant preform is used to form a light-diffusing element with voids therein. By utilizing relatively low permeability gases and/or relatively high sintering rates, holes can be trapped in the consolidated glass during the consolidation process. During the soot consolidation step, the soot goes through a densification process via exposure to high heat to remove the open porosity (e.g. pores between the soot which is not surrounded by densified glass) and leave densified glass. In the context of the present disclosure, the trapping of substantial amounts of the ambient gas present in the consolidation process precludes full densification of the glass and voids remain in the glass after consolidation. Soot consolidation may be performed in a soot consolidation furnace. The sintering rate can be increased by increasing the sintering temperature and/or increasing the downfeed rate of the soot preform through the sintering zone of the consolidation furnace. Under certain sintering conditions, it is possible to obtain glasses in which the area fraction of the trapped gases is a significant fraction of the total area or volume of the preform.

A soot preform may be formed by depositing silica-containing soot onto an outer surface of a rotating and translating mandrel or bait rod. This process is known as the OVD or outside vapor deposition process. The mandrel is preferably tapered and the soot is formed by providing a glass precursor in gaseous form to the flame of a burner to oxidize it. A fuel, such as methane ($CH_4$) and a supporting combustion gas, such as oxygen, is provided to the burner and ignited to form the flame. Glass former compounds (e.g. $SiCl_4$, octamethylcyclotetrasiloxane) are oxidized in the flame to form a generally cylindrically-shaped soot region on a mandrel or substrate. A dopant compound may be included.

The soot preform may be consolidated in a consolidation furnace to form a consolidated blank. Prior to consolidation, the mandrel is removed to form a hollow, cylindrical soot blank preform. During the consolidation process, the soot preform is suspended, for example, inside a pure quartz muffle tube of the consolidation furnace by a holding mechanism. Preferably, before the consolidation step, the preform is exposed to a drying atmosphere. For example, a suitable drying atmosphere may include about 95% to 99% helium and 1% to 5% chlorine gas at a temperature of between about 950° C. and 1250° C. and a suitable drying time ranges from about 0.5 and 4.0 hours.

During the consolidation step, which preferably takes place after a soot drying step, the furnace temperature is raised and the preform is consolidated at a suitable temperature, for example between about 1390° C. and 1535° C. to form a consolidated preform.

Gradient sintering may be employed whereby the soot preform is driven down through a hot zone of the furnace, which is maintained at a temperature of between about 1225° C. to 1550° C., or between about 1390° C. and 1535° C. For example, the preform may be held in an isothermal zone which is maintained at a desired drying temperature (950-1250° C.), after which the soot preform is driven through a zone which is maintained at a desired consolidation temperature (e.g. between 1225° C. and 1550° C., or between 1390° C. and 1535° C.) at a rate of speed which is sufficient to result in the preform temperature increasing by greater than 1° C./min. Upper zones of the furnace can be maintained at lower temperatures which facilitate a drying and impurity removal step. The lower zone can be maintained at the higher temperatures desired for consolidation. The soot containing preform may downfed through a consolidation hot zone at a first downfeed rate, followed by downfeeding of the preform through a second hot zone at a second downfeed rate which is less than the first downfeed rate. Such a consolidation technique results in the outside portion of the soot preform sintering before the rest of the preform sinters, thereby facilitating trapping of gases which will in turn facilitate formation of and retaining of voids in the resultant consolidated glass.

For example, the preform can be exposed to such suitable consolidation temperatures (e.g. greater than about 1390° C.) at a first speed which is sufficient to result in the preform temperature increasing by more than 15° C./min, more preferably greater than 17° C./min, followed by at least a second downfeed rate/consolidation temperature combination which is sufficient to result in the preform heating by at least about 12° C./min, more preferably greater than 14° C./min. Preferably, the first consolidation rate results in the outside of the preform increasing in temperature at a rate which is greater than 2° C., or greater than 10° C., or greater than about 20° C., and most preferably greater than 50° C./min higher than the heating rate of the second consolidation rate. If desired, a third consolidation step or even further consolidation steps can be employed which heats at a slower rate (e.g. less than 10° C./min). Alternatively, the soot preform can be sintered at even faster rates in order to create more voids by driving the soot preform through a furnace hot zone where the temperature is greater than 1550° C., or greater than 1700° C., even more preferably greater than 1900° C. Alternatively, the soot preform can be sintered at even faster rates external to the furnace by using an open flame or plasma torch in contact with the soot.

Voids may be formed by exposing the preform to a gas during sintering and/or consolidation. The gas used to form internal voids in the preform may be referred to herein as a void-producing gas. Preferred void-producing gases include one or more of $N_2$, Ar, Kr, $CO_2$, $O_2$, air, $SO_2$, $Cl_2$, $CF_4$, or mixtures thereof. Void-producing gases may be used directly or in the presence of a diluent gas during sintering or consolidation. Each of the void-producing gases exhibits a relatively low permeability in silica glass at or below the consolidation temperature that is suitable for forming internal voids in accordance with the methods present disclosure. Preferably these void-producing gases are employed either alone or in combination in an amount between 5% and 100% by volume, or between about 20% and 100% by volume, or between about 40% and 100% by volume. The remainder of the sintering or consolidation gas atmosphere is made up of a suitable diluent or carrier gas such as, for example, helium, hydrogen, deuterium, or mixtures thereof. Generally speaking, the greater the percentage of void-producing gases employed in the sintering gas, the larger and more abundant the voids will be in the resultant consolidated glass. As a result, control of the size, shape, number density, and spatial distribution of internal voids can be achieved through variations in the type of void-producing gas, the pressure of the void-producing gas in the processing environment, and/or the ratio of void-producing gas to diluent gas.

When it is desired to deposit additional soot via OVD to the resultant glass perform or cane subsequent to the void-producing consolidation process, a sintering gas that includes less than 10% $O_2$, or less than 5% $O_2$, or no $O_2$ may be employed to avoid loss of seeds upon exposure to hydrogen formed in the OVD process. The void-producing gas may be a combination of $N_2$ and Ar, where the combination of $N_2$ and Ar is employed in the sintering atmosphere in an amount greater than 10% by volume, or greater than 30% by volume, or greater than 50% by volume.

Using the sintering gases described herein, it is desirable to employ a consolidation process which includes a downfeed of the preform at a rate and temperature which is sufficient to result in at least some of the consolidation gases being intentionally trapped. This can occur, for example, by heating of at least a portion of the soot preform greater than about 10° C./min, more preferably greater than about 12° C./min, even more preferably greater than about 14° C./min. The sintering temperatures employed in the present invention preferably are greater than 1100° C., or greater than 1300° C., or greater than 1400° C., or and greater than 1450° C.

The gaseous atmosphere employed during the consolidation process, the temperature inside the consolidation furnace, and preform consolidation rate may be selected so that, during the soot consolidation process, gases are intentionally trapped within the preform, forming internal voids in the consolidated glass. These gas containing internal voids are preferably not entirely outgassed prior to and/or during the element drawing process, so that the internal voids remain in the glass after the glass has been drawn. A variety of process parameters can be controlled to vary and control the size of the voids. For example, increasing the consolidation time or temperature can increase the void size, as the increased temperature causes the gases trapped within the voids to expand. Similarly, the size and area percent of the voids can be impacted by the draw conditions. For example, a longer hot zone in a draw furnace and/or a faster draw speed tends to increase the size as well as the area percent of the voids. Selection of a gas that is more permeable in glass at the consolidation temperature will result in smaller voids.

Sintering rate can also have a significant effect on void size and void density. A faster sintering rate will result in the formation of more and larger voids. However, use of sintering rates that are too slow will result in no voids being formed, as the gas will have time to escape through the glass. Consequently, the downfeed rate of the preform and/or the consolidation temperature employed are preferably high enough to result in the heating of at least a portion of the preform at a rate greater than about 10° C./min, more preferably greater than about 12° C./min, even more preferably greater than about 14° C./min. Generally speaking, a preform having a lower soot density will result in formation of more voids. However, the density of the deposited soot in a particular preform can be varied to position more voids (higher regional void area percent) where desired. For example, a first high density soot region can be deposited directly onto a consolidated glass (e.g. pure silica) core cane, followed by a second region of soot having a lower density than that of the first. We have found that this causes a higher void area percent to form near the core (i.e. in the high density soot region). The silica containing soot preferably has a bulk density of between about 0.10 g/cc and 1.7 g/cc, more preferably between about 0.30 g/cc and 1.0 g/cc. This effect can also be used to form consolidated void containing preforms which alternate between low or no void containing regions and higher void containing regions; wherein the initial soot density radial variation is greater than 3 percent over a distance of at least 100 μm. Additional information about fabrication and processing may be found in U.S. Pat. No. 7,450,806, the disclosure of which is hereby incorporated by reference herein.

A polymer cladding can be formed on a glass core (doped or undoped, with or without internal voids) by applying a cladding composition of the type described hereinabove to the glass core during the process of drawing the core from a preform. The cladding composition is a liquid and can be sprayed, brushed or otherwise applied to the drawn glass core. Reaction of the cladding composition provides a polymer cladding on the glass core. In one embodiment, the reaction is a photoreaction and polymerization (curing) of the cladding composition occurs upon exposing the applied coating composition to radiation of proper wavelength. The proper wavelength is a wavelength capable of initiating the curing reaction and may be dictated by the choice of photoinitiator used in the cladding composition.

Internal voids may be formed in the polymer cladding by performing the curing in the presence of a void-producing gas. As the curing reaction proceeds, cladding composition becomes increasingly viscous and the void-producing gas gets trapped in the polymer to form internal voids. To retain voids, it is preferable that the void-producing gas be insoluble or only weakly soluble in the polymer cladding. The void-producing gas should also have a low diffusion coefficient in the polymer cladding. Suitable void-producing gases for the polymer cladding include $O_2$, $N_2$, air, and Ar. The size, shape, and number density of internal voids in the polymer cladding can be controlled by varying the type of void-producing gas, the time of exposure of the cladding composition during curing to the void-producing gas, and the pressure or concentration of void-producing gas in the curing environment.

In one embodiment, the characteristics of internal voids formed in the polymer cladding are varied by including a gas that is soluble in the cladding polymer along with a void-producing gas in the curing environment. The soluble gas dilutes the void-producing gas and a mixture of the soluble gas and void-producing gas is initially incorporated as an internal void. As curing proceeds and/or time passes, the soluble gas exits the internal void and dissolves in the cladding polymer, leading to a partial collapse (shrinkage) of the internal void. By controlling the relative proportions of soluble gas and void-producing gas, it is possible to systematically vary the size of internal voids. A high proportion of soluble gas in a mixture with the void-producing gas is expected to produce smaller internal voids on average and vice versa. In one embodiment, the soluble gas is $CO_2$.

Nanoparticles may be incorporated in the polymer cladding by adding nanoparticles (directly as a solid, in the form of a suspension, or in a solvent) to the cladding composition before applying the cladding composition to the drawn glass core. As the curing reaction proceeds and the polymer cladding forms, the nanoparticles become incorporated in the polymer cladding. In one embodiment, the nanoparticles are incorporated as a dispersed phase in the polymer cladding.

The light-diffusing element may include a protective coating surrounding the cladding. The protective coating is intended to protect the light-diffusing element from mechanical damage. The protective coating may be formed from a curable protective coating composition that includes one or more monomers. The monomers may include ethylenically unsaturated compounds. The curable protective coating composition may also include one or more oligomers, one or more polymerization initiators, and one or more additives. In one embodiment, the protective coating is the polymerization product of a protective coating composition that contains urethane acrylate monomers.

The monomer component of the curable protective coating composition may include one or more monomers. The one or more monomers may be present in an amount of 50 wt % or greater, or in an amount from about 75 wt % to about 99 wt %, or in an amount from about 80 wt % to about 99 wt % or in an amount from about 85 wt % to about 98 wt %.

The monomer component of the curable protective coating composition may include ethylenically unsaturated compounds. The ethylenically unsaturated monomers may be monofunctional or polyfunctional. The functional groups may be polymerizable groups and/or groups that facilitate or enable crosslinking. In combinations of two or more monomers, the constituent monomers may be monofunctional, polyfunctional, or a combination of monofunctional and polyfunctional compounds. Suitable functional groups for ethylenically unsaturated monomers include, without limitation, (meth)acrylates, acrylamides, N-vinyl amides, styrenes, vinyl ethers, vinyl esters, acid esters, and combinations thereof.

Exemplary monofunctional ethylenically unsaturated monomers include, without limitation, hydroxyalkyl acrylates such as 2-hydroxyethyl-acrylate, 2-hydroxypropyl-acrylate, and 2-hydroxybutyl-acrylate; long- and short-chain alkyl acrylates such as methyl acrylate, ethyl acrylate, propyl acrylate, isopropyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate, 2-ethylhexyl acrylate, nonyl acrylate, decyl acrylate, isodecyl acrylate, undecyl acrylate, dodecyl acrylate, lauryl acrylate, octadecyl acrylate, and stearyl acrylate; aminoalkyl acrylates such as dimethylaminoethyl acrylate, diethylaminoethyl acrylate, and 7-amino-3,7-dimethyloctyl acrylate; alkoxyalkyl acrylates such as butoxyethyl acrylate, phenoxyethyl acrylate (e.g., SR339, Sartomer Company, Inc.), and ethoxyethoxyethyl acrylate; single and multi-ring cyclic aromatic or non-aromatic acrylates such as cyclohexyl acrylate, benzyl acrylate, dicyclopentadiene acrylate, dicyclopentanyl acrylate, tricyclodecanyl acrylate, bornyl acrylate, isobornyl acrylate (e.g., SR423, Sartomer Company, Inc.), tetrahydrofiurfuryl acrylate (e.g., SR285, Sartomer Company, Inc.), caprolactone acrylate (e.g., SR495, Sartomer Company, Inc.), and acryloylmorpholine; alcohol-based acrylates such as polyethylene glycol monoacrylate, polypropylene glycol monoacrylate, methoxyethylene glycol acrylate, methoxypolypropylene glycol acrylate, methoxypolyethylene glycol acrylate, ethoxydiethylene glycol acrylate, and various alkoxylated alkylphenol acrylates such as ethoxylated(4) nonylphenol acrylate (e.g., Photomer 4066, IGM Resins); acrylamides such as diacetone acrylamide, isobutoxymethyl acrylamide, N,N'-dimethyl-aminopropyl acrylamide, N,N-dimethyl acrylamide, N,N diethyl acrylamide, and t-octyl acrylamide; vinylic compounds such as N-vinylpyrrolidone and N-vinylcaprolactam; and acid esters such as maleic acid ester and fumaric acid ester. With respect to the long and short chain alkyl acrylates listed above, a short chain alkyl acrylate is an alkyl group with 6 or less carbons and a long chain alkyl acrylate is alkyl group with 7 or more carbons.

Representative polyfunctional ethylenically unsaturated monomers include, without limitation, alkoxylated bisphenol A diacrylates, such as ethoxylated bisphenol A diacrylate, with the degree of alkoxylation being 2 or greater. The monomer component of the secondary composition may include ethoxylated bisphenol A diacrylate with a degree of ethoxylation ranging from 2 to about 30 (e.g. SR349 and SR601 available from Sartomer Company, Inc. West Chester, Pa. and Photomer 4025 and Photomer 4028, available from IGM Resins), or propoxylated bisphenol A diacrylate with the degree of propoxylation being 2 or greater; for example, ranging from 2 to about 30; methylolpropane polyacrylates with and without alkoxylation such as ethoxylated trimethylolpropane triacrylate with the degree of ethoxylation being 3 or greater; for example, ranging from 3 to about 30 (e.g., Photomer 4149, IGM Resins, and SR499, Sartomer Company, Inc.); propoxylated-trimethylolpropane triacrylate with the degree of propoxylation being 3 or greater; for example, ranging from 3 to 30 (e.g., Photomer 4072, IGM Resins and SR492, Sartomer); ditrimethylolpropane tetraacrylate (e.g., Photomer 4355, IGM Resins); alkoxylated glyceryl triacrylates such as propoxylated glyceryl triacrylate with the degree of propoxylation being 3 or greater (e.g., Photomer 4096, IGM Resins and SR9020, Sartomer); erythritol polyacrylates with and without alkoxylation, such as pentaerythritol tetraacrylate (e.g., SR295, available from Sartomer Company, Inc. (West Chester, Pa.)), ethoxylated pentaerythritol tetraacrylate (e.g., SR494, Sartomer Company, Inc.), and dipentaerythritol pentaacrylate (e.g., Photomer 4399, IGM Resins, and SR399, Sartomer Company, Inc.); isocyanurate polyacrylates formed by reacting an appropriate functional isocyanurate with an acrylic acid or acryloyl chloride, such as tris-(2-hydroxyethyl) isocyanurate triacrylate (e.g., SR368, Sartomer Company, Inc.) and tris-(2-hydroxyethyl) isocyanurate diacrylate; alcohol polyacrylates with and without alkoxylation such as tricyclodecane dimethanol diacrylate (e.g., CD406, Sartomer Company, Inc.) and ethoxylated polyethylene glycol diacrylate with the degree of ethoxylation being 2 or greater; for example, ranging from about 2 to 30; epoxy acrylates formed by adding acrylate to bisphenol A diglycidylether and the like (e.g., Photomer 3016, IGM Resins); and single and multi-ring cyclic aromatic or non-aromatic polyacrylates such as dicyclopentadiene diacrylate and dicyclopentane diacrylate.

The protective coating composition may or may not include an oligomeric component. One or more oligomers may be present in the protective composition. One class of oligomers that may be included is ethylenically unsaturated oligomers. When employed, suitable oligomers may be monofunctional oligomers, polyfunctional oligomers, or a combination of a monofunctional oligomer and a polyfunctional oligomer. If present, the oligomer component may include aliphatic and aromatic urethane (meth)acrylate oligomers, urea (meth)acrylate oligomers, polyester and polyether (meth)acrylate oligomers, acrylated acrylic oligomers, polybutadiene (meth)acrylate oligomers, polycarbonate (meth)acrylate oligomers, and melamine (meth)acrylate oligomers or combinations thereof. The protective coating composition may be free of urethane groups, urethane acrylate compounds, urethane oligomers, or urethane acrylate oligomers.

The oligomeric component of the protective coating composition may include a difunctional oligomer. A difunctional oligomer may have a structure according to formula (I) below:

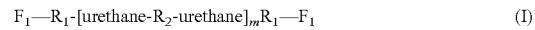

$$F_1—R_1-[\text{urethane-}R_2\text{-urethane}]_m R_1—F_1 \quad (I)$$

where $F_1$ may independently be a reactive functional group such as acrylate, methacrylate, acrylamide, N-vinyl amide, styrene, vinyl ether, vinyl ester, or other functional group known in the art; $R_1$ may include, independently, —$C_{2-12}$ O—, —($C_{2-4}$—O)$_n$—, —$C_{2-12}$ O—($C_{2-4}$—O)$_n$—, —$C_{2-12}$ O—(CO—$C_{2-5}$ O)$_n$—, or —$C_{2-12}$ O—(CO—$C_{2-5}$ NH)$_n$—, where n is a whole number from 1 to 30, including, for example, from 1 to 10; $R_2$ may be a polyether, polyester, polycarbonate, polyamide, polyurethane, polyurea, or combination thereof; and m is a whole number from 1 to 10, including, for example, from 1 to 5. In the structure of formula (I), the urethane moiety may be the residue formed from the reaction of a diisocyanate with $R_2$ and/or $R_1$. The term "independently" is used herein to indicate that each $F_1$ may differ from another $F_1$ and the same is true for each $R_1$.

The oligomer component of the curable protective composition may include a polyfunctional oligomer. The polyfunctional oligomer may have a structure according to formula (II), formula (III), or formula (IV) set forth below:

$$\text{multiurethane-}(F_2\text{—}R_1\text{—}F_2)_x \quad \text{(II)}$$

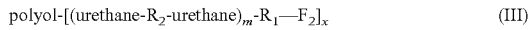

$$\text{polyol-}[(\text{urethane-}R_2\text{-urethane})_m\text{-}R_1\text{—}F_2]_x \quad \text{(III)}$$

$$\text{multiurethane-}(R_1\text{—}F_2)_x \quad \text{(IV)}$$

where $F_2$ may independently represent from 1 to 3 functional groups such as acrylate, methacrylate, acrylamide, N-vinyl amide, styrene, vinyl ether, vinyl ester, or other functional groups known in the art; $R_1$ can include —$C_{2-12}$ O—, —($C_{2-4}$—O)$_n$—, —$C_{2-12}$ O—($C_{2-4}$—O)$_n$—, —$C_{2-12}$ O—(CO—$C_{2-5}$ O)$_n$—, or —$C_{2-12}$ O—(CO—$C_{2-5}$ NH)$_n$— where n is a whole number from 1 to 10, including, for example, from 1 to 5; $R_2$ may be polyether, polyester, polycarbonate, polyamide, polyurethane, polyurea or combinations thereof; x is a whole number from 1 to 10, including, for example, from 2 to 5; and m is a whole number from 1 to 10, including, for example, from 1 to 5. In the structure of formula (II), the multiurethane group may be the residue formed from reaction of a multiisocyanate with $R_2$. Similarly, the urethane group in the structure of formula (III) may be the reaction product formed following bonding of a diisocyanate to $R_2$ and/or $R_1$.

Urethane oligomers may be prepared by reacting an aliphatic or aromatic diisocyanate with a dihydric polyether or polyester, most typically a polyoxyalkylene glycol such as a polyethylene glycol. Moisture-resistant oligomers may be synthesized in an analogous manner, except that polar polyethers or polyester glycols are avoided in favor of predominantly saturated and predominantly nonpolar aliphatic diols. These diols may include alkane or alkylene diols of from about 2-250 carbon atoms that may be substantially free of ether or ester groups.

Polyurea elements may be incorporated in oligomers prepared by these methods, for example, by substituting diamines or polyamines for diols or polyols in the course of synthesis.

The protective coating composition may also contain a polymerization initiator to facilitate polymerization (curing) after application of the protective coating composition to the cladding. For many acrylate-based coating formulations, photoinitiators, such as the known ketonic photoinitiating and/or phosphine oxide additives, may be used. The amount of photoinitiator may be adjusted to promote radiation cure to provide reasonable cure speed without causing premature gelation of the protective coating composition. A desirable cure speed may be a speed sufficient to cause curing of the coating composition of greater than about 90%, or greater than 95%). As measured in a dose versus modulus curve, a cure speed for coating thicknesses of about 75 μm may be, for example, less than 1.0 J/cm² or less than 0.5 J/cm².

Suitable photoinitiators for the protective coating composition may include, without limitation, 2,4,6-trimethylbenzoyl-diphenylphosphine oxide (e.g. Lucirin TPO); 1-hydroxycyclohexylphenyl ketone (e.g. Irgacure 184 available from BASF); (2,6-diethoxybenzoyl)-2,4,4-trimethylpentyl phosphine oxide (e.g. in commercial blends Irgacure 1800, 1850, and 1700, BASF); 2,2-dimethoxyl-2-phenyl acetophenone (e.g., Irgacure,651, BASF); bis(2,4,6-trimethylbenzoyl)phenyl phosphine oxide (e.g., Irgacure 819, BASF); (2,4,6-triiethylbenzoyl)diphenyl phosphine oxide (e.g., in commercial blend Darocur 4265, BASF); 2-hydroxy-2-methyl-1-phenylpropane-1-one (e.g., in commercial blend Darocur 4265, BASF) and combinations thereof.

In addition to the above-described components, the protective coating composition of the present invention may optionally include an additive or a combination of additives. Representative additives include, without limitation, antioxidants, catalysts, lubricants, low molecular weight non-crosslinking resins, adhesion promoters, and stabilizers. Additives may operate to control the polymerization process, thereby affecting the physical properties (e.g., modulus, glass transition temperature) of the polymerization product formed from the composition. Additives may affect the integrity of the polymerization product of the composition (e.g., protect against de-polymerization or oxidative degradation).

The protective coating composition may include thiodiethylene bis(3,5-di-tert-butyl)-4-hydroxyhydrocinnamate (e.g., Irganox 1035, available from BASF) as an antioxidant. The protective coating composition may include an acrylated acid adhesion promoter (such as Ebecryl 170 (available from UCB Radcure (Smyrna Ga.)).

The protective coating has a higher modulus than the cladding polymer material. The protective coating has a Young's modulus, when configured as a cured rod having a diameter of about 0.022" of at least about 1000 MPa, or at least about 1200 MPa, or at least about 1400 MPa, or at least about 1600 MPa, or at least about 1800 MPa.

The thickness of the protective coating is in the range from 30 μm to 90 μm, or in the range from 40 μm to 80 μm, or in the range from 50 μm to 70 μm. An optional white ink layer may be applied on top of the protective coating. The function of the ink layer is to make sure that the scattered radiation is uniform in all directions. The white ink layer may include $TiO_2$ powder loaded into a coating material of the type used for the protective coating. Alternatively, $TiO_2$ powder may be loaded directly in the protective coating.

The protective coating is formed by applying the protective coating composition to the cladding and initiating reaction of the protective coating composition to form the protective coating on the cladding. In one embodiment, the protective coating is formed by curing a protective coating composition during draw of a glass preform. When the cladding is a polymer formed by curing a cladding composition, the protective coating composition may be applied to the cladding composition before or after curing of the cladding composition (wet-on-wet or wet-on-dry configurations).

After initial processing, the fabricated element may have a cylindrical or rod configuration. Post-fabrication processing may be employed to alter the shape of the light-diffusing element. Conventional softening, bending, and/or casting techniques may be employed to achieve bent or arbitrarily-shaped light-diffusing elements having voids in accordance with the present disclosure, for example, can be made.

The light-diffusing element may be incorporated in an optical system that includes a light source. The light source may be a lamp, diode, laser, laser diode, LED (light-emitting diode) or other source. The light source may operate over all or part of the spectral range from 200 nm to 2000 nm. To insure efficient coupling of the light source to the light-diffusing element, it is desirable to insure that the numerical aperture of the light-diffusing element is comparable to or exceeds the numerical aperture of the light source. The numerical aperture of the light-diffusing element is controlled by the relative refractive indices of the core and cladding. The numerical aperture of the light-diffusing element can be increased by increasing the refractive index of the core and/or decreasing the refractive index of the cladding. The refractive index of the core can be increased by including updopant(s) as scattering center(s) in the core glass composition. The refractive index of the cladding can be reduced by incorporating internal voids as scattering centers in the cladding, employing polymer cladding instead of silica glass cladding, and using fluorinated versions of cladding polymer materials. The numerical aperture of the light-diffusing element may be at least 0.4, or at least 0.5, or at least 0.6, or at least 0.7, or at least 0.8.

Figure 5:
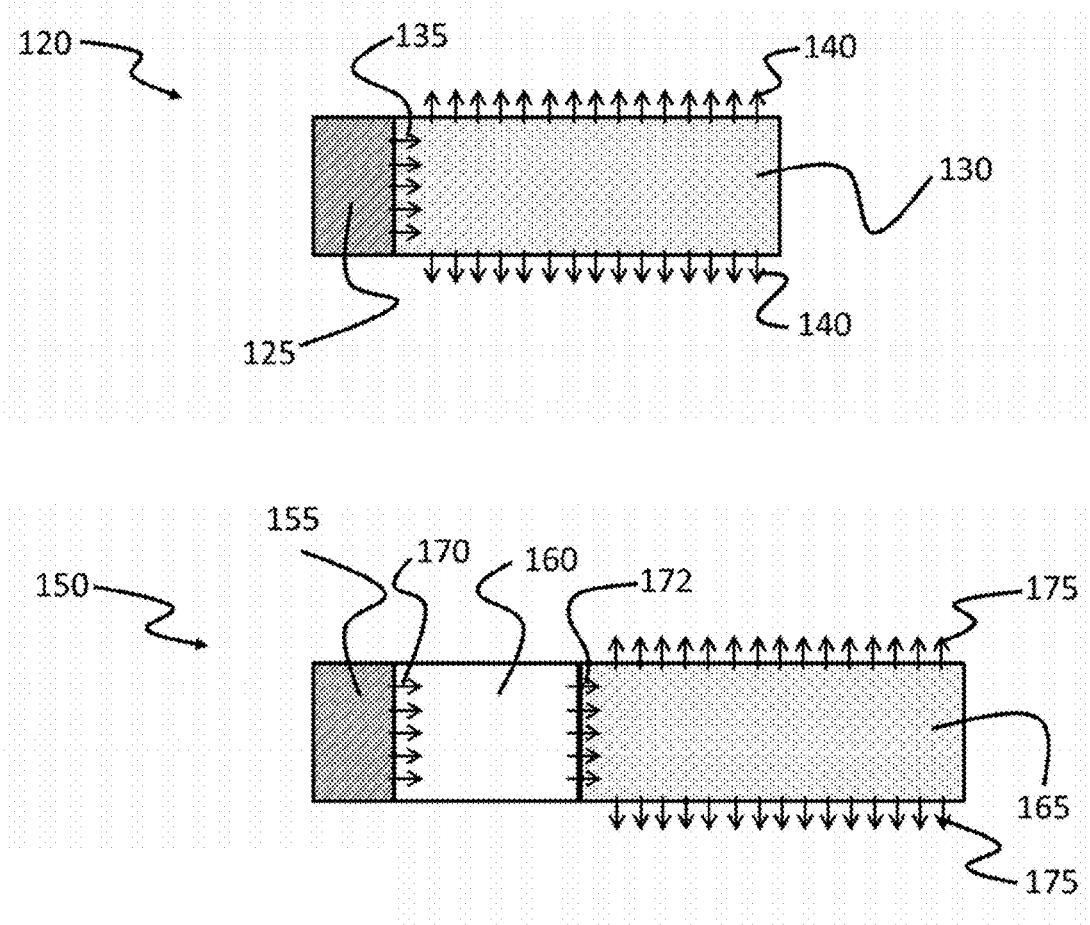
FIG. 5 illustrates illuminations systems that include a light source coupled to a light-diffusing element.

FIG. 5 illustrates illumination systems incorporating a light-diffusing element. Illumination system 120 includes light source 125 and light-diffusing element 130. Light source 125 launches source light 135 into light-diffusing element 130. Internal voids within light-diffusing element 130 scatter source light 135 to produce illumination light 140 that exits through the outer surface of light-diffusing element 130. Light source 125 may be in direct contact with light-diffusing element 130 (e.g. "butt coupled") or an air gap may be present. Although illumination light 140 is depicted for reasons of convenience of illustration as parallel rays, it is to be understood that illumination light 140 may include rays of light that are directed in random directions.

Illumination system 150 includes light source 155, optic 160, and light-diffusing element 165. Light source 155 launches source light 170 into optic 160, which may process source light 170 to provide source light 172 to light-diffusing element 165. Internal voids within light-diffusing element 165 scatter source light 172 to produce illumination light 175 that exits through the outer surface of light-diffusing element 165. Although illumination light 175 is depicted for reasons of convenience of illustration as parallel rays, it is to be understood that illumination light 140 may include rays of light that are directed in random directions.

Light sources that may be incorporated in an illumination system include lamps, lasers, diodes, laser diodes, and light-emitting diodes. An intervening optic, such as optic 160 shown in FIG. 5, is an element of the illumination system that may facilitate coupling of a light source to a light-diffusing element. The optic may collect, collimate, focus, and/or otherwise process light supplied from a light source. The optic may be a solid glass element, a solid polymer or plastic element, a glass or polymer optical fiber, a lens or other coupling element.

Light-diffusing elements in accordance with the present disclosure may be deployed in illumination systems, as light sources (e.g. for photochemical reactions, cooling spaces, heating spaces, or closed spaces with controlled environments), and as luminaires. The light-diffusing elements are suitable for functional and decorative lighting applications.

Figure 6:
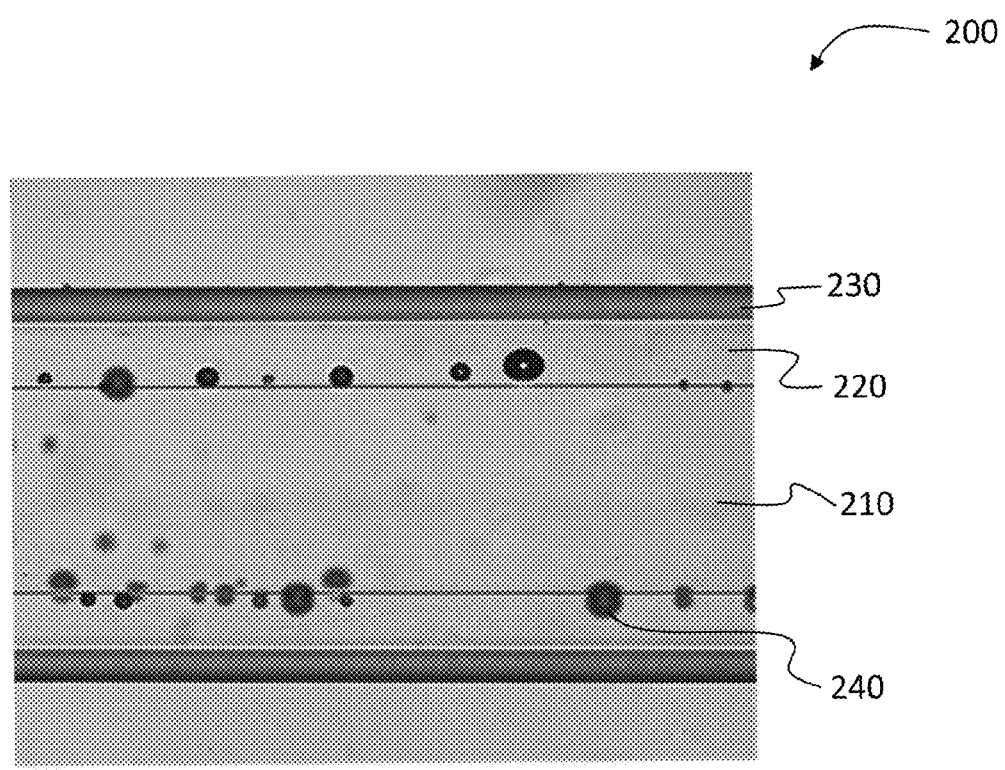
FIG. 6 illustrates a light-diffusing element having a glass core, a polymer cladding and protective coating.

FIG. 6 shows an image of a portion of an illustrative light-diffusing element. Light-diffusing element 200 includes glass core 210, polymer cladding 220, and protective coating 230. Glass core 210 is made from silica glass and has a diameter of 125 Polymer cladding 220 is a low modulus urethane acrylate polymer having a thickness of 32.5 Protective coating 230 is a high modulus urethane acrylate polymer having a thickness of 32.5 Light-diffusing element 200 includes a plurality of scattering centers 240 in polymer cladding 220. Scattering centers 240 are internal voids of various sizes filled with $N_2$ gas and were made by exposing the cladding composition to $N_2$ gas during application of the cladding composition to glass core 210 and subsequent curing of the cladding composition to form polymer cladding 220. Glass core 210 and protective coating 230 lack scattering centers.

To assess scattering loss, a series of calculations was performed. In the calculation, attenuation due to light scattering from a bulk material containing scattering centers was determined. The light had a wavelength of 560 nm. The bulk material was a fluorinated acrylate polymer having a refractive index of 1.37 at 560 nm. The fluorinated acrylate polymer is representative of cladding polymer materials. The scattering centers included internal voids in the form of spherical gas bubbles having a refractive index of 1.0 and $TiO_2$ nanoparticles having a refractive index of 2.4. In a first calculation, the scattering centers were spherical gas bubbles having a diameter of 1 μm and a concentration of 100/mm$^3$ in the bulk material. The scattering loss was calculated to be 2 dB/m. In a second calculation, the scattering centers were spherical gas bubbles having a diameter of 5 μm and a concentration of 10/mm$^3$ in the bulk material. The scattering loss was calculated to be 3 dB/m. In a third calculation, the scattering centers were spherical gas bubbles having a diameter of 10 μm and a concentration of 1/mm$^3$ in the bulk material. The scattering loss was calculated to be 1.6 dB/m. In a fourth calculation, the scattering centers were $TiO_2$ nanoparticles having a diameter of 0.2 μm and a concentration of 2000/mm$^3$ in the bulk material. The scattering loss was calculated to be 2.4 dB/m.

Figure 7:
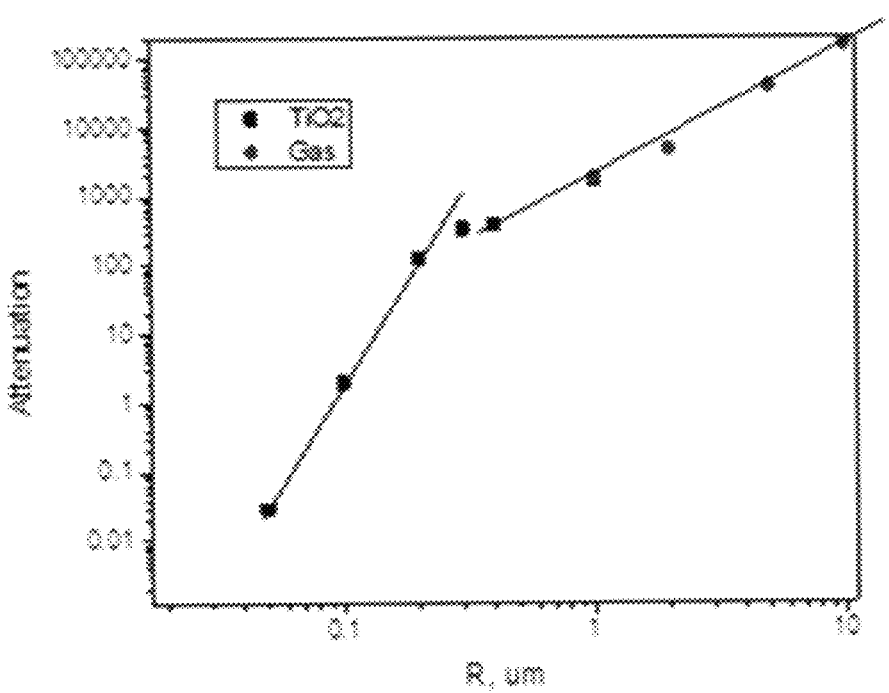
FIG. 7 compares the calculated attenuation of an optical signal in light-diffusing elements having scattering centers in the form of internal voids and nanoparticles.

FIG. 7 shows the results of a separate calculation that shows attenuation losses as a function of radius for gas-filled internal void and $TiO_2$ scattering centers in the fluorinated acrylate polymer bulk material. The calculation for FIG. 7 assumes a constant concentration of 1 scattering center per cubic micron. The dimensions of attenuation are m$^{-1}$ which can be converted to dB/m by multiplying by 10. Data points for radius values less than 1 μm correspond to $TiO_2$ scattering centers. Data points for radius values greater than 1 μm correspond to gas-filled internal void scattering centers. Data points for each type of scattering center are given at a radius value of 1 μm. The results show an increase in attenuation (scattering loss) as the radius of the scattering center increases. As indicated hereinabove, the presence of gas-filled internal voids in the cladding lowers the average refractive index of the cladding and is a recommended strategy for increasing the numerical aperture of light-diffusing elements to achieve better coupling efficiency with light sources having high numerical apertures. The presence of $TiO_2$ nanoparticles, in contrast, leads to an increase in the average refractive index of the cladding and makes it more difficult to obtain a light-diffusing element having a high numerical aperture.

Although the calculations described herein refer to bulk cladding polymer material instead of cladding polymer material in the configuration of a the present light-diffusing elements, the results are predictive of the scattering losses expected for light-diffusing elements having glass cores without scattering centers and a fluorinated acrylate polymer with gas-filled internal voids or $TiO_2$ nanoparticles as scattering centers. In a typical light-diffusing element, most of the light is guided by the core and approximately 2-3% of the light enters the cladding as an evanescent field. The scattering losses calculated for the bulk material can be accordingly scaled to provide estimates of the scattering loss available from the bulk material in the configuration of a polymer cladding as described herein.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the illustrated embodiments. Since modifications, combinations, sub-combinations and variations of the disclosed embodiments that incorporate the spirit and substance of the illustrated embodiments may occur to persons skilled in the art, the description should be construed to include everything within the scope of the appended claims and their equivalents.

What is claimed is:

1. A light-diffusing element comprising:
   a glass core, said glass core having a diameter greater than 65 µm; and
   a cladding surrounding said glass core, said cladding having a lower refractive index than said glass core, said cladding including first scattering centers, said first scattering centers having a cross-section with a dimension of at least 25 nm;
   wherein said element exhibits light scattering losses of at least 0.1 dB/m.

2. The light-diffusing element of claim 1, wherein said cladding comprises glass.

3. The light-diffusing element of claim 2, wherein said first scattering centers include internal voids, said internal voids being filled by a gas and having a cross-section with a dimension between 50 nm and 20 µm.

4. The light-diffusing element of claim 3, wherein said gas is selected from the group consisting of $N_2$, $O_2$, air, Ar, $CO_2$, $SO_2$, and $Cl_2$.

5. The light-diffusing element of claim 3, wherein said internal voids have a cross-section with a dimension between 500 nm and 10 µm.

6. The light-diffusing element of claim 3, wherein said internal voids have a length between 1 µm and 50 m.

7. The light-diffusing element of claim 3, wherein the concentration of said internal voids in said cladding is at least 1% by volume.

8. The light-diffusing element of claim 1, wherein said cladding comprises a polymer.

9. The light-diffusing element of claim 8, wherein said polymer comprises fluorine.

10. The light-diffusing element of claim 8, wherein said first scattering centers include internal voids, said internal voids being filled by a gas and having a cross-section with a dimension between 25 nm and 40 µm.

11. The light-diffusing element of claim 10, wherein said gas is selected from the group consisting of $N_2$, air, and Ar.

12. The light-diffusing element of claim 10, wherein said internal voids have a cross-section with a dimension between 50 nm and 20 µm.

13. The light-diffusing element of claim 10, wherein the concentration of said internal voids in said cladding is at least 1.0% by volume.

14. The light-diffusing element of claim 8, wherein said first scattering centers include nanoparticles, said nanoparticles having a cross-section with a dimension of at least 25 nm.

15. The light-diffusing element of claim 14, wherein said cross-sectional dimension of said nanoparticles is less than 500 nm.

16. The light-diffusing element of claim 15, wherein said nanoparticles have a composition selected from the group consisting of $Al_2O_3$, $SiO_2$, $ZrO_2$, $Y_3Al_5O_{12}$, and rare earth oxides.

17. The light-diffusing element of claim 15, wherein said nanoparticles are luminescent.

18. The light-diffusing element of claim 15, wherein said nanoparticles have a concentration in said cladding of at least 1.0% by volume.

19. An illumination system comprising:
    a light source optically coupled to a light-diffusing element, said light-diffusing element comprising:
    a glass core, said glass core having a diameter greater than 65 µm; and
    a cladding surrounding said glass core, said cladding having a lower refractive index than said glass core, said cladding including first scattering centers, said first scattering centers having a cross-section with a dimension of at least 25 nm;
    wherein said element exhibits light scattering losses of at least 0.1 dB/m.

20. The illumination system of claim 19, wherein said light source is an LED or a laser diode.

21. A method for forming a light-diffusing element comprising:
    forming a core, said core comprising glass;
    forming a cladding in direct contact with said core, said cladding including first scattering centers, said first scattering centers having a cross-section with a dimension of at least 25 nm.

22. The method of claim 21, wherein said forming core includes drawing a glass preform.

23. The method of claim 22, wherein said forming cladding includes applying a curable composition to said core and curing said curable composition.

24. The method of claim 23, wherein said forming cladding includes curing said curable composition in the presence of a void-producing gas.

25. The method of claim 23, wherein said first scattering centers are nanoparticles, and wherein said curable composition further includes said nanoparticles.

26. The light diffusing element of claim 1, wherein said first scattering centers are distributed throughout a cross-sectional area of said cladding.

27. The light diffusing element of claim 1, wherein said cladding includes second scattering centers.

28. The light diffusing element of claim 27, wherein said first scattering centers are voids and said second scattering centers are nanoparticles.

29. The light diffusing element of claim 1, wherein said core lacks scattering centers.

30. A method for forming a light-diffusing element comprising:
    forming a core, said core comprising glass, said forming core including drawing a glass preform;
    forming a cladding on said core, said cladding including first scattering centers, said first scattering centers having a cross-section with a dimension of at least 25 nm, said forming cladding including applying a curable composition to said core and curing said curable composition in the presence of a void-producing gas.

* * * * *